(12) United States Patent
Suzuki et al.

(10) Patent No.: US 7,343,451 B2
(45) Date of Patent: *Mar. 11, 2008

(54) DISK ARRAY DEVICE AND REMOTE COPYING CONTROL METHOD FOR DISK ARRAY DEVICE

(75) Inventors: Hidenori Suzuki, Atami (JP); Keiichi Kaiya, Hadano (JP); Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 102 days.

This patent is subject to a terminal disclaimer.

(21) Appl. No.: 11/328,307

(22) Filed: Jan. 10, 2006

(65) Prior Publication Data

US 2006/0117138 A1 Jun. 1, 2006

Related U.S. Application Data

(63) Continuation of application No. 10/766,187, filed on Jan. 29, 2004, now Pat. No. 7,017,007.

(30) Foreign Application Priority Data

Dec. 25, 2003 (JP) ............................. 2003-428917

(51) Int. Cl.
*G06F 12/00* (2006.01)

(52) U.S. Cl. ..................... 711/114; 711/4; 711/100; 711/112; 711/113; 711/161; 711/162; 711/166; 711/171; 711/172; 711/173; 710/1; 710/3; 710/4; 710/52; 710/58; 710/59; 710/60; 710/305; 710/306; 710/307; 714/5; 714/6; 707/204

(58) Field of Classification Search .................. 711/4, 711/100, 113–114, 161–162, 166, 171–173; 710/1, 3–4, 52, 58–60, 305–307; 707/204; 714/5–6

See application file for complete search history.

(56) References Cited

U.S. PATENT DOCUMENTS 5,142,627 A  8/1992  Elliot et al.

(Continued)

FOREIGN PATENT DOCUMENTS

| JP | 2002-334049 | 5/2001 |
| JP | 2003-030053 | 7/2001 |
| JP | 2003-032290 | 3/2002 |

OTHER PUBLICATIONS

S.M. Fry, et al., "Interrupting Data Transfers", IBM Technical Disclosure Bulletin, vol. 27, No. 2, (Jul. 1984), pp. 1109-1111, XP002349545.
European Search Report dated Nov. 25, 2005.

*Primary Examiner*—Sanjiv Shah
*Assistant Examiner*—Zhuo H Li
(74) *Attorney, Agent, or Firm*—Reed Smith LLP; Stanley P. Fisher, Esq.; Juan Carlos A. Marquez, ESq.

(57) ABSTRACT

Various types of resources of the disk array device are divided for respective users and communications resources used in remote copying are appropriately assigned to the users so that functional interference between the split units is prevented and stable remote copying is realized. SLPRs which are dedicated regions for the respective users are set inside the disk array device 10. Each SLPR is constituted by dividing various types of resources of ports, cache memories, logical units and the like, and cannot be accessed by an unauthorized host computer 1. Furthermore, a manager of one of the SLPRs likewise cannot refer to or alter the constructions of the other SLPRs. During remote copying, the amount of transfer within the unit time is detected for each of the SLPRs. If the amount of transfer within the unit time exceeds the maximum amount of transfer, a response to the host computer 1 from this SLPR is deliberately delayed, so that the inflow of data from the host computer 1 is restricted.

12 Claims, 12 Drawing Sheets

U.S. PATENT DOCUMENTS

| | | |
|---|---|---|
| 5,185,694 A | 2/1993 | Edenfield et al. |
| 5,384,669 A | 1/1995 | Dunn et al. |
| 5,517,631 A | 5/1996 | Machado et al. |
| 5,596,736 A | 1/1997 | Kerns |
| 5,724,539 A | 3/1998 | Riggle |
| 5,802,310 A | 9/1998 | Rajaraman |
| 5,835,940 A | 11/1998 | Yorimitsu et al. |
| 5,875,464 A * | 2/1999 | Kirk .......................... 711/129 |
| 5,953,338 A | 9/1999 | Ma et al. |
| 6,324,654 B1 | 11/2001 | Wahl et al. |
| 6,408,357 B1 | 6/2002 | Hanmann et al. |
| 6,499,083 B1 | 12/2002 | Hamlin |
| 6,611,903 B2 | 8/2003 | Fujimoto et al. |
| 6,625,623 B1 | 9/2003 | Midgley et al. |
| 6,766,388 B2 | 7/2004 | Gerhart |
| 6,772,283 B2 | 8/2004 | Taroda et al. |
| 7,017,007 B2 * | 3/2006 | Suzuki et al. ................ 711/114 |
| 2002/0178327 A1 * | 11/2002 | Fujimoto et al. ............ 711/113 |
| 2003/0061362 A1 | 3/2003 | Qiu et al. |
| 2004/0010605 A1 | 1/2004 | Furukawa et al. |
| 2004/0181594 A1 | 9/2004 | Suleiman |

* cited by examiner

FIG.9(a)

| INFLOW STATE MANAGEMENT INFORMATION ||| T4 |
|---|---|---|---|
| SLPR NUMBER | INFLOW LIMITATION STATE | INFLOW DELAY TIME | |
| SLPR0 | INFLOW LIMITED | T0 | |
| SLPR1 | — | — | |
| SLPR2 | INFLOW LIMITED | T2 | |
| ⋮ | ⋮ | ⋮ | |

FIG.9(b)

| MAXIMUM TRANSFER AMOUNT MANAGEMENT INFORMATION || T5 |
|---|---|---|
| SLPR NUMBER | MAXIMUM TRANSFER AMOUNT | |
| SLPR0 | DTmax0 | |
| SLPR1 | DTmax1 | |
| SLPR2 | DTmax2 | |
| ⋮ | ⋮ | |

FIG.9(c)

| UNIT TIME TRANSFER AMOUNT MANAGEMENT INFORMATION || T6 |
|---|---|---|
| SLPR NUMBER | UNIT TIME TRANSFER AMOUNT | |
| SLPR0 | DT0 | |
| SLPR1 | DT1 | |
| SLPR2 | DT2 | |
| ⋮ | ⋮ | |

…

DISK ARRAY DEVICE AND REMOTE COPYING CONTROL METHOD FOR DISK ARRAY DEVICE

CROSS-REFERENCE TO RELATED APPLICATION

This application is a Continuation of U.S. application Ser. No. 10/766,187 filed on Jan. 29, 2004 now U.S. Pat. No. 7,017,007, and claims priority from U.S. application Ser. No. 10/766,187 filed on Jan. 29, 2004, which claims priority from Japanese Patent Application NO. 2003-428917 filed Dec. 25, 2003, the entire disclosure of which is incorporated herein by reference.

BACKGROUND OF THE INVENTION

Field of the Invention

The present invention relates to a disk array device and a remote copying control method for a disk array device.

In a disk array device, for example, numerous disk drives are disposed in the form of an array, so that the device is constructed on the basis of a RAID (redundant array of independent inexpensive disks). Logical volumes which are logical memory regions are formed in the physical memory regions of the respective disk drives. LUNs (logical unit numbers) are assigned to these logical volumes beforehand. the host computer can issue write commands or read commands of a specified format to the disk array device by specifying the LUN or the like. As a result, the host computer can read or write desired data from or into the disk array device.

A plurality of host computers can be connected to the disk array device. Here, in cases where data groups managed by a certain host computer or application program can be read from or written into other host computers or application programs, problems may arise. Accordingly, techniques such as zoning, LUN masking and the like are used. Zoning is a technique in which one or a plurality of zones are set in the disk array device, and the transfer of data is permitted only to specified communications ports or WWNs (world wide names) belonging to the zones. LUN masking is a technique in which specified host computers are allowed access to specified LUNs (Japanese Patent Application Laid-Open No. 2003-30053). Furthermore, in regard to remote copying, the conventional techniques described below are known (Japanese Patent Application Laid-Open No. 2002-334049 and Japanese Patent Application Laid-Open No. 2003-032290).

Limitations on the access of host computers to the disk array device can be set by conventional zoning or LUN masking. However, in the case of conventional techniques, only the limitation of access is possible; the exclusive use of resources or divisions of resources with security taken into account is impossible. Specifically, even in cases where access limitations are set, if instructions for an erroneous change in construction are issued from the storage management software of a managing terminal, this may possibly have an effect on resources used by other host computers.

Especially in cases where memory regions of the disk array device are assigned to a plurality of enterprises or the like and used by these enterprises or the like, it is necessary to set security so that the construction of the regions managed by the respective enterprises cannot by altered by the managing terminals used by other enterprises. In conventional techniques, however, no consideration is given to security in such cases.

In a disk array device, data backup is appropriately performed for purposes of data preservation and the like. So-called remote copying (or mirroring) is known as one such backup technique. In remote copying, data that is managed by a local system (this is a local disk array system, and may also be called a master system or primary system) is transferred to a remote system (remote disk array system) installed in location that is physically separated from the local system. As a result, data groups of the same content are respectively stored by the local system and the remote system.

Similarly, in cases where the memory resources of one disk array device are assigned to a plurality of enterprises or the like and are respectively used by these enterprises or the like, remote copying can be respectively performed for each of the use regions of the respective enterprises. Here, in cases where the local system and remote system are connected by (for example) an expensive dedicated line or the like, the band of the communications network that is used for remote copying is naturally limited. Accordingly, in cases where a plurality of different remote copying operations are performed using limited shared communications resources, the remote copying of the use region of a certain enterprise or the like may affect the remote copying of regions used by other enterprises or the like. Specifically, for example, if a certain remote copying operation occupies the entire band of the communications network for a long period of time, other remote copying operations cannot be performed while this remote copying is being performed, so that the there is a drop in the convenience of use and the like.

Accordingly, in the conventional technique described in Japanese Patent Application Laid-Open No. 2002-334049, all of the side files for which remote copying is performed are managed in the disk array device, and the quantities of data of the respective host computers that occupy the side files are individually controlled. Furthermore, in the conventional technique described in Patent Reference 3, the local system and remote system are connected via a channel extender, and a communications network is automatically selected from a plurality of communications networks on the basis of user policy.

However, even in cases where all of the side files are controlled within the disk array device, data transfer is accomplished via a limited shared communications network between the local system and the remote system. In the technique described in Patent Reference 2, since remote copying is performed by the shared use of limited communications resources between the local system and remote system, the respective host computers or application programs still affect each other, so that there is room for improvement.

Use bands can be assigned to respective communications ports using a channel extender as in the technique described in Japanese Patent Application Laid-Open No. 2003-032290. In this case, however, the communications ports must be assigned to the respective host computers beforehand, and in cases where the construction inside the disk array device is altered, the setting of the digital extender must also be altered accordingly. Consequently, in the case of the conventional techniques described in the abovementioned patents, alterations in the construction of the disk array device cannot be handled in a flexible manner, so that there is room for improvement in terms of convenience of use.

SUMMARY OF THE INVENTION

Accordingly, it is one object of the present invention to provide a disk array device and a remote control method for a disk array device which make it possible to perform a plurality of data transfer operations in an efficient manner using limited communications resources. It is another object of the present invention to provide a disk array device and a remote control method for a disk array device which make it possible to perform data transfer in respective logical system partitions in the disk array device while reducing the effects of data transfer in other logical system partitions. Other objects of the present invention will become clear from the description of embodiments below.

BRIEF DESCRIPTION OF THE DRAWINGS

FIG. 9 shows explanatory diagrams which illustrate various types of management information used in remote copying, with FIG. 9 (a) showing inflow state management information, FIG. 9 (b) showing maximum transfer amount management information, and FIG. 9 (c) showing unit time transfer amount management information;

DESCRIPTION OF THE PREFERRED EMBODIMENTS

Figure 1:
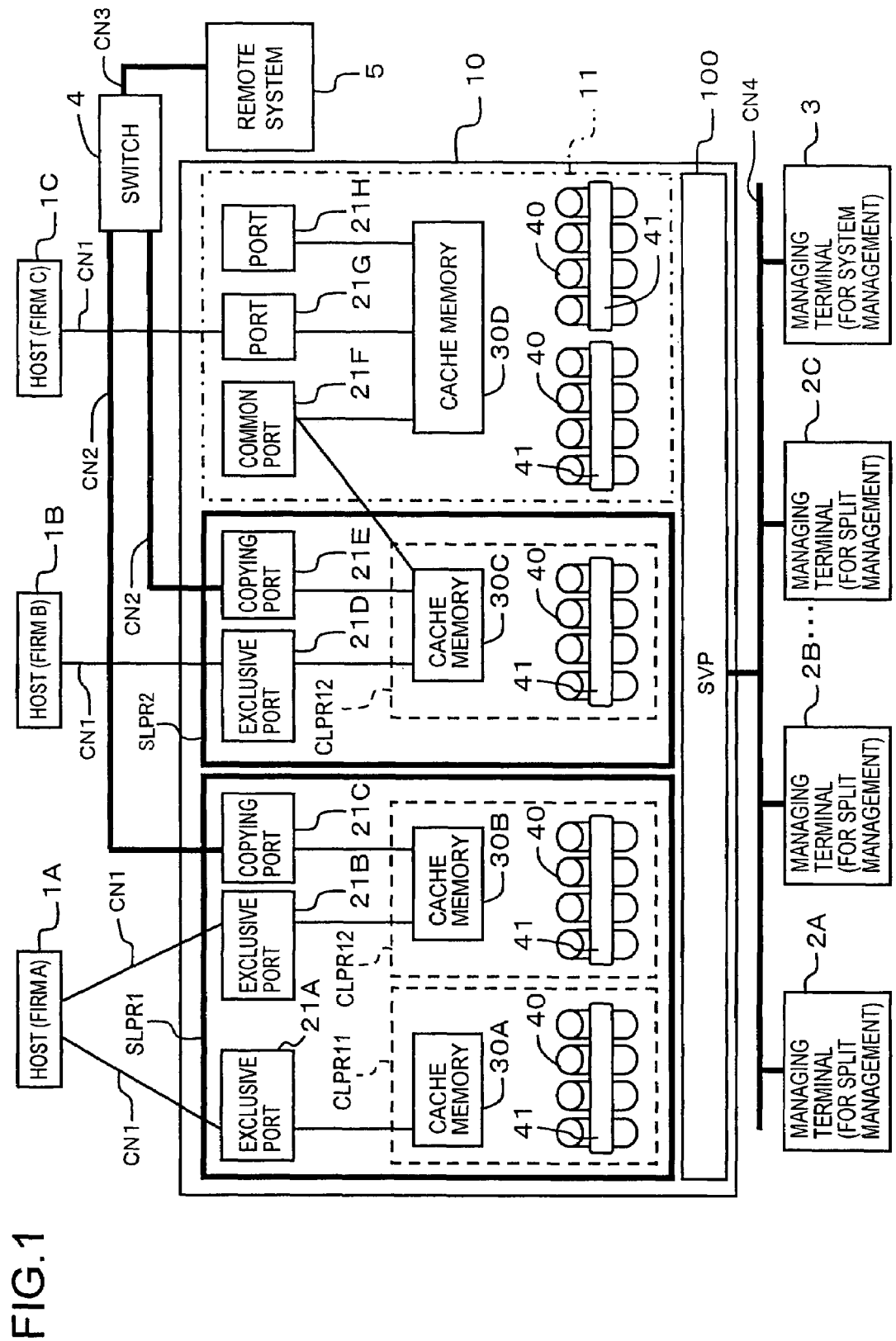
FIG. 1 is a block diagram which shows an outline of the overall construction of a disk array device constituting an embodiment of the present invention.

In order to solve the abovementioned problems, the disk array device of the present invention comprises a channel adapter connected to a host device and external device via a communications port for controlling the exchange of data with these host device and external device, a disk adapter for controlling the exchange of data with a memory device, a cache memory used by the channel adapter and disk adapter, one or more logical system partitions which are constructed by logically dividing resources provided by the channel adapter, disk adapter, memory device and cache memory, a data transfer amount detection part which detects the amount of data transferred to the external device from the logical system partitions for each of logical system partitions, and a data transfer control part which compares a specified value that is preset for each logical system partition and the data transfer amount detected by the transfer amount detection part, and performs band control that limits the transfer of data from the logical system partitions to the external device when the data transfer amount exceeds this specified value.

One or more logical system partitions may be set inside the disk array device. These logical system partitions are formed by logically dividing the resources provided by the channel adapter, the resources provided by he disk adapter, the resources provided by the memory device and the resources provided by the cache memory. Here, physical resources or logical resources such as the communications port of the channel adapter, a logical unit (logical volume) that is set in the memory region of the memory device, cache memory capacity and the like may be cited as examples of concrete resources. Specifically, each of the logical system partitions occupies independent strange system resources. Furthermore, one or more host devices can be respectively connected to each of the logical system partitions. Moreover, one or more cache partitions formed by dividing the memory resources of the cache memories can be disposed inside the logical system partitions.

A specified value is set beforehand for the data transfer of each logical system partition. The data transfer control part compares the data transfer amount detected by the transfer amount detection part with this specified value, and respectively limits data transfer for each logical system partition in cases where the data transfer amount exceeds this specified value. For example, disk array devices in remote sites (secondary sites) that have the same construction as the disk array device in the local site (primary site) may be cited as examples of external devices. For example, it is sufficient if the external devices can store copies of the disk array device installed at the local site; the cache memory capacity and the like need not be the same.

In one aspect of the present invention, data transfer to external devices is performed on the basis of write requests from host devices.

In one aspect of the present invention, a managing part that is used to set the specified value in a variable manner is provided.

In one aspect of the present invention, split region managing parts that perform setting alterations within the logical system partitions and a system managing part which is used to set the assignment of resources to the logical system partitions and the specified values in a variable manner are provided. The split region managing parts alter settings within the respectively assigned logical system partitions. The system managing part performs setting alterations (assignment of resources, setting of specified values and the like) for the disk array device as a whole. The respective split region managing parts can perform operations only on the respectively assigned logical system partitions, and cannot perform operations on other logical system partitions. On the other hand, the system managing part can perform operations on all of the logical system partitions.

In one aspect of the present invention, the specified values can be set according to the quantity of resources assigned to the logical system partitions. For example, in cases where the amount of the logical volume that is assigned to a logical system partition is large, the system can be controlled so that the band used in data transfer is broadened. Alternatively, for example, in cases where the amount of cache memory that is assigned to a logical system partition is large, the system can be controlled so that that communications band that is assigned to this logical system partition is broadened (that is, so that the specified value for this logical system partition is increased).

In one aspect of the present invention, the data transfer control part can vary the band width between cases in which data transfer is performed by an asynchronous system and cases in which data transfer is performed by a synchronous system. Here, synchronous data transfer is a mode which is devised so that in cases where there is a write request (request for data updating) from a host device, the completion of writing is reported to the host device after the transfer of data to an external device has been confirmed. Asynchronous data transfer is a mode which is devised so that in cases where there is a write request, the completion of writing is reported to the host device at the point in time at which the data is stored in the cache memory (i.e., prior to the transfer of the data to the external device). Furthermore, for example, cases where synchronous data transfer is selected may be viewed as cases where reliability of the transfer of data to external devices is sought, while cases where asynchronous data transfer is selected may be viewed as cases where an increased response speed is sought. Accordingly, for example, in cases where synchronous data transfer is selected, the system may be controlled so that the communications band is broadened (i.e., so that the specified value is set at a large value) in order to prevent a drop in the response characteristics while ensuring the reliability of data transfer. The reason for this is that in cases where synchronous data transfer is performed, the transfer performance may have a great effect on the service response characteristics.

For example, the following construction may be employed. Specifically, a band for synchronous copying transfer and a band for asynchronous copying transfer are set beforehand via the managing part. Then, when data transfer is initiated, it is discriminated whether this transfer is a synchronous data transfer or asynchronous data transfer, and data that is transferred by synchronous data transfer is preferentially transferred. As a result of preference being given to synchronous data transfer, a limitation of data inflow can be executed with respect to host devices involved in asynchronous data transfer in cases where data that is to be transmitted by asynchronous data transfer has accumulated in the cache memory in an amount that exceeds a specified amount.

Furthermore, the units in which the band for synchronous data transfer or asynchronous data transfer is set may be (for example) each logical volume of the object of transfer (remote copying or the like) or each group formed by grouping a plurality of logical volumes. Alternatively, instead of setting the band in volume units or group units constructed from a plurality of volumes, it would also be possible to simply divide the band between synchronous data transfer and asynchronous data transfer, and to set the band for each type of transfer.

In one aspect of the present invention, initial data transfer and differential data transfer are included in the data transfer to external devices from the logical system partitions, and the system is devised so that the data transfer control part can vary the band control between cases where initial data transfer is performed and cases where differential data transfer is performed. For example, in the case of remote copying, the same data groups are held in the local system and remote system. In cases where the same data groups are formed in the respective systems, the memory contents of the local system at a certain point in time are first of all copied as whole into the remote system (initial data transfer or initial copying). Next, differential data (updated data) that is generated following the initial copying is transferred from the local system to the remote system, so that the memory contents are synchronized (differential data transfer or differential copying). When the initial copying is completed, a duplicate of the data at a certain point in time is constructed in the remote system, and is placed in a recoverable state. Accordingly, for example, in cases where a quick transition to a recoverable state is desired, a broad communications band can be assigned to the initial copying.

For example, the following construction may be used. A band for initial copying and a band for differential copying are set beforehand via the managing part. The bands can be set for each logical volume, for each group constructed from a plurality of logical volumes, or simply so that the bands are divided between initial copying and differential copying or the like. Then, when copying is initiated, it is discriminated whether the copying is initial copying or differential copying, and in cases where it is judged that the copying is initial copying, the data of this initial copying is preferentially transferred.

In one aspect of the present invention, the data transfer control part limits data transfer by restricting the amount of data that is written into the logical system partitions from host devices in cases where the data transfer amount exceeds a specified value.

In one aspect of the present invention, the data transfer control part limits data transfer by delaying the response to data write requests from host devices by a specified preset time in cases where the data transfer amount exceeds a specified value. Since host devices issue new data write requests by a response from the disk array device, the amount of data per unit time that is written by host devices can be restricted by delaying the response.

Below, embodiments of the present invention will be described with reference to FIGS. 1 through 12. In these embodiments, a disk array device comprising channel adapters which are respectively connected to host devices and external devices via communications ports, and which control the exchange of data with these host devices and external devices, disk adapters which control the exchange of data with memory devices, cache memories which are respectively used by the channel adapters and disk adapters, and one or more logical system partitions which are constructed by logically dividing the resources respectively provided by the channel adapters, disk adapters, memory devices and cache memories, is disclosed. Furthermore, each of the channel adapters comprises a data receiving part that receives data from host devices, a cache control part that stores the received data in a specified region of the cache memory, a data acquisition part which acquires data to be transferred from the cache memory to the external disk array device, a transfer processing part which transfers the data acquired by the data acquisition part to the external disk array device, a transfer amount detection part which detects the amount of data transferred from the logical system partitions to the external disk array device for each logical system partition, a first data transfer control part which compares the specified value set beforehand for each logical system partition and the data transfer amount detected by the transfer amount detection part, and a second data transfer control part which limits the transfer of data from the logical system partition in question to the external disk array device by delaying the response to the data write request from the host device by a preset specified time in cases where it is judged by the first data transfer control part that the data transfer amount exceeds the specified value.

Furthermore, a remote copying control method for a disk array device comprising one or more logical system partitions is also disclosed in the present embodiments. This remote copying control method comprises the steps of judging whether or not remote copying is to be performed from a logical system partition to an external disk array device, specifying the logical system partition for which remote copying is to be performed in cases where it is judged that remote copying is to be performed, detecting the amount of data transfer from the specified logical system partition to the external disk array device, comparing the maximum transfer amount that is set beforehand for the specified logical system partition with the detected data transfer amount, limiting the data transfer from the specified logical system partition to the external disk array device by delaying the response to the data write request from the host device by a preset specified time in cases where it is judged that the data transfer amount exceeds the maximum transfer amount, and performing data transfer from the specified logical system partition to the external disk array device without any limitation in cases where it is judged that the data transfer amount is equal to or less than the maximum transfer amount.

First Embodiment

FIG. 1 is a block diagram which shows an overall outline of a memory system which contains a disk array device 10. The disk array device 10 is a local disk array system (hereafter called the "local system") which is installed at the local site. The disk array device 10 is respectively connected via a communications network CN1 to a plurality of host computers 1A through 1C (hereafter referred to as the "host computer 1" in cases where no particular distinction is made between the individual computers) so as to allow two-way communications. Here, the communications network CN1 is (for example) an LAN (local area network), an SAN (storage area network), the internet, a dedicated line or the like. In cases where an LAN is used, data transfer between the host computer 1 and the disk array device 10 is performed according to the TCP/IP (transmission control protocol/internet protocol) protocol. In cases where an SAN is used, data transfer between the host computer 1 and disk array device 10 is performed according to a fiber channel protocol. Furthermore, in cases where the host computer 1 is a main frame, data transfer is performed according to a communications protocol such as (for example) FICON (Fibre Connection; registered trademark), ESCON (Enterprise System Connection; registered trademark), ACONARC (Advanced Connection Architecture; registered trademark), FIBARC (Fibre Connection Architecture; registered trademark) or the like.

For example, each host computer 1 is realized as a server, personal computer, workstation, main frame or the like. For instance, each host computer 1 is connected to a plurality of client terminals positioned outside the figures via a separate communications network. For example, each host computer 1 provides services to the respective client terminals by reading and writing data from or into the disk array device 10 in response to requests from the respective client terminals. As will be described later, a plurality of virtual packages (SPLRs: storage logical partitions) are disposed inside the disk array device 10. Furthermore, a certain host computer 1A can access only the SLPR 1 that is assigned to firm A, while another host computer 1B can access only the SLPR 2 that is assigned to firm B. Still another host computer 1C can utilize various resources within the non-split region 11. Each host computer 1 can access only the SLPR for which this computer has access authority, and cannot refer to or update other SLPRs. Likewise, the computers cannot access undefined logical units.

As will be described later, the disk array device 10 comprises a plurality of channel adapters (hereafter abbreviated to "CHA") 20, a cache memory 30, a plurality of disk drives 40, a plurality of disk adapters (hereafter abbreviated to "DKA") 50, a shared memory 60, a switching part 70, a hub 80, and an SVP 100.

A plurality of SLPRs, i.e., SLPR 1 and SLPR 2, are set inside the disk array device 10. Here, the SLPRs are regions that are constructed by dividing and assigning the various physical resources and logical resources inside the disk array device 10 to respective users (or respective application programs). Specifically, for example, each SLPR comprises a dedicated communications port (hereafter referred to as a "port") 21, a dedicated cache memory 30, and a dedicated logical unit (logical volume) 41. In concrete terms, in the example shown in the figures, the SLPR 1 that can be used only by firm A comprises three ports 21A through 21C, cache memories 30A and 30B, and a logical unit 41. Furthermore, the SLPR 2 that can be used only by firm B comprises two ports 21D and 21E, a cache memory 30 and a logical unit 41. The disk array device 10 is managed in SLPR units that are split for the respective users. Furthermore, the host computer C1 of firm C does not have a dedicated region, and uses the non-split region 11.

The following attributes can be set in the respective ports inside the disk array device 10. For example, the exclusive ports are ports that are occupied by the SLPRs; this means that these ports are ports that cannot be used by host computers other than the host computer 1 that is associated with the port beforehand. The copying ports are ports that are used to transfer data to the remote system 5 that is the external disk array device. The common ports are ports that can access all of the disk drives 40 inside the disk array device 10. In addition, other attributes such as ordinary ports in cases where an SLPR is not used, unused ports and the like can also be set. For example, the port 21G corresponds to an ordinary port, and the port 21H corresponds to an unused port.

One or more cache partitions (CLPR: cache logical partitions) can be disposed in each SLPR. In the example shown in the figures, two CLPRs 11 and 12 are disposed inside the SLPR 1, and one CLPR 21 is disposed inside the SLPR 2. The CLPRs are formed by logically dividing the cache memories 30. The cache memory 30A is assigned to the CLPR 11, the cache memory 30B is assigned to the CLPR 12, and the cache memory 30C is assigned to the CLPR 12. The respective CLPRs can exclusively utilize cache memories with memories determined for the respective CLPRs by further dividing the cache volume assigned to the SLPR as a plurality of CLPRs. Accordingly, in cases where the amount of access of a certain business is increased, a situation in which there is an effect on other businesses as a result of a large amount of cache being ensured of the use of this business can be prevented.

The SVP (service processor) 100 is a computer device that is used for the management and monitoring of the disk array device 10; this SVP provides a server function used for management. For example, the SVP 100 gathers various types of environmental information, performance information and the like from the respective CHAs 20, DKAs 50 and the like via an internal network CN11 (see FIG. 2) such as an LAN or the like that is installed inside the disk array device 10. Examples of the information gathered by the SVP 100 includes device construction, power supply alarms, temperature alarms, input-output speed (IOPS) and the like. For example, the SVP 100 and the respective managing terminals 2A through 2C and 3 are connected via a communications network CN4 such as an LAN or the like. By logging into the SVP 100 via the managing terminals, managers can perform (for example) the setting of RAID construction, blocking processing of various types of packages (CHA, DKA, disk drives or the like), various types of setting alterations and the like.

A plurality of managing terminals 2A through 2C and 3 can be connected to the SVP 100. Here, the managing terminals 2A through 2C are terminals that are installed for the respective SLPRs, and the managing terminal 3 is a terminal that is installed in order to manage the disk array device 10 as a whole. Accordingly, the managing terminals 2A through 2C are operated by the managers who manage the respective SLPRs (hereafter referred to as the "split managers"). The managing terminal 3 is operated by a system manager who manages the disk array device 10 as a whole (hereafter referred to as the "overall manager").

The split managers of the respective SLPRs can perform various types of setting alterations or the like only for the SLPRs for which these managers themselves have managing authority, and are not permitted to refer to or alter the constructions or the like of other SLPRs. ON the other hand, the system manager can perform various types of setting alterations or the like for the disk array device 10 as a whole, including the respective SLPRs.

The system manager can set the SLPRs for the respective users by logging into the SVP 100 via the managing terminal 3, and appropriately dividing the physical resources and logical resources of the disk array device 10. Furthermore, the system manager can also issue user IDs or the like to the split managers that manage the respective SLPRs. The split managers can log into the SVP 100 using the exclusive user IDs issued by the system manager. The split managers can alter the settings inside the SLPRs that are under their own management by operating the managing terminals 2. For example, the split managers can perform the assignment of disk drives 40, the definition of logical units 41, and assignment of cache memories 30 and the like in order to produce a construction corresponding to the desired business configuration. Specifically, the SLPRs are set by the system manager, while the CLPRs inside the respective SLPRs are set by the split managers.

The disk array device 10 is connected to a switch 4 via the communications network CN3. Furthermore, the disk array device 10 is connected to the remote disk array system (hereafter abbreviated to "remote system") 5 from the switch 4 via the communications network CN3. For example, the switch 4 is constructed form a channel extender or the like. The copying ports 21C and 21E of the respective SLPRs 1 and 2 are respectively connected to the input side of the switch 4 via a communications network CN2. The output side of the switch 4 is connected to the remote system 5 via the communications network CN3. The switch 4 amplifies signals from the disk array device 10 that constitutes the local system, and transmits these signals to the remote system 5.

The respective SLPRs 1 and 2 transmit the data that is to be remotely copied (among the data respectively managed by these SLPRs) to the remote system 5 via the respective copying ports 21C, 21E and the like, and a duplicate of the data is constructed inside the remote system 5. As a result, if the data of the local system should be some chance be lost, or in cases where the function is stopped or the like, service can be continued or quickly restored by using the data stored in the remote system 5. It is sufficient if the remote system 5 is provided with the memory resources required for the duplication of data; this remote system 5 need not have the same construction as the local system. Generally, the remote system may comprise CHAs, DKAs, cache memories, disk drives and the like.

Figure 2:
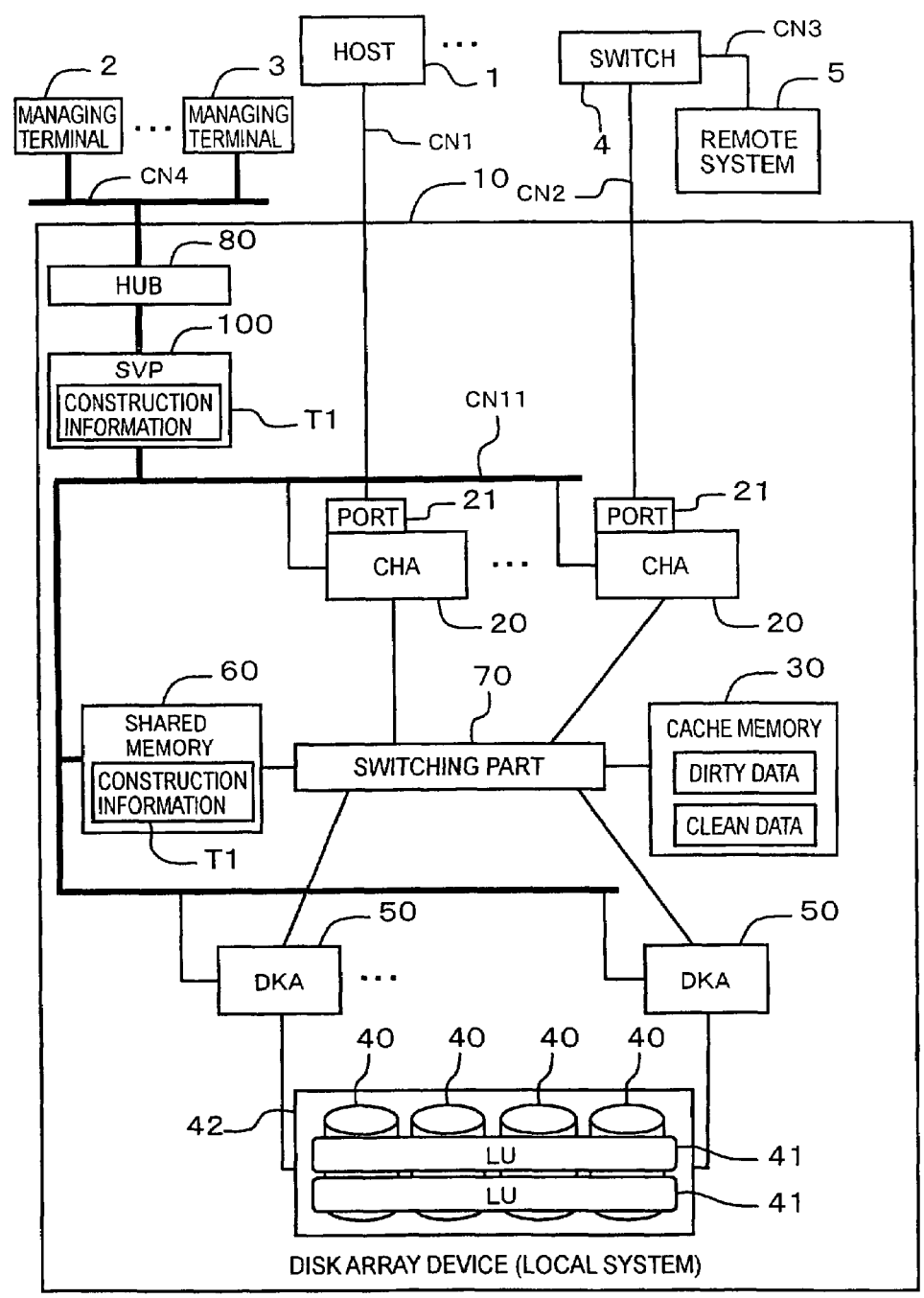
FIG. 2 is a block diagram which focuses on the physical construction of the disk array device.

FIG. 2 is a block diagram which focuses on the hardware construction of the disk array device 10. For example, a plurality of CHAs 20, such as four or eight CHAs or the like, can be installed inside the disk array device 10. The respective CHAs 20 have respective ports 21. Each CHA 20 is prepared according to the type of the host computer 1, as an open type CHA, main frame type CHA or the like. Each CHA 20 controls data transfer with the host computer 1. Each CHA 20 comprises a processor part, data communications part and local memory part (none of which is shown in the figures).

Each CHA 20 receives commands requesting the reading or writing of data, as well as data itself, from the corresponding connected host computer 1, and acts according to the commands that are received from the host computer 1. To describe this operation in advance, including the operation of the DKAs, for example, when the CHA 20 receives a data read request from the host computer 1, the CHA 20 causes a read command to be stored in the shared memory 60. The DKA 50 occasionally refers to the shared memory 60, and if an unprocessed read command is discovered, data is read out from the disk drive 40 and stored in the cache memory 30. The CHA 20 reads out the data transferred to the cache memory 30, and transmits this data to the host computer 1 that issued the command.

Furthermore, for example, when the CHA 20 receives a data write request from the host computer 1, the CHA 20 causes a write command to be stored on the shared memory 60 and at the same time causes the received data (user data) to be stored in the cache memory 30. Here, since the data for which writing was requested by the host computer 1 is "dirty data" that is not written into the disk drive 40, this is (for example) respectively stored in a plurality of locations and multiplexed. After storing the data in the cache memory 30, the CHA 20 reports to the host computer 1 that writing has been completed. Then, in accordance with the write command stored in the shared memory 60, the DKA 50 reads out the data stored in the cache memory 30, and stores this data in a specified disk drive 40. The attribute of the data that is written into the disk drive 40 changes from "dirty data" to "clean data", and the data is released from the multiplex management of the cache memory 30. Furthermore, in the present specification, the term "dirty data" refers to data that is not written into the disk drives 40, and that requires multiplex management. Furthermore, the term "clean data" refers to data that is written into the disk drives 40, and that does not require multiplex management.

For example, each cache memory 30 stores user data and the like. For example, this cache memory 30 is constructed from a nonvolatile memory. The cache memory 30 can be constructed from a plurality of memories, and is capable of multiplex management of dirty data.

The disk array device 10 comprises a memory device 42. The memory device 42 is constructed from numerous disk drives 40. Each disk drive 40 can be realized as (for example) a hard disk drive (HDD), semiconductor memory device or the like. The memory device 42 need not be installed inside the disk array device 10; this memory device 42 may be present on the outside. Furthermore, this memory device 42 need not be a memory device 42 that belongs to the disk array device 10; this memory device 42 may be an old type memory device, or the memory device of another firm. In cases where the memory device 42 is the product of another firm or the like, the memory device 42 manufactured by another firm can be mapped in the logical units (LDEVs) of the disk array device 10 or in virtual devices (VDEV) installed under these logical units, and can be used as though this memory device were the memory device of the disk array device 10 itself.

Here, for example, one RAID group can be constructed by four disk drives 40. The term "RAID group" refers to a disk group which realizes the redundant storage of data according to (for example) a RAID 5 (this is not limited to a RAID 5). One or more logical units 41 (LU or LDEV) constituting logical memory regions can be set in the physical memory region provided by each RAID group.

In the case of each DKA 50, a plurality of DKAs, e.g., four or eight DKAs or the like, can be installed inside the disk array device 10. The respective DKAs 50 control data communications with the respective disk drives 40, and each DKA 50 comprises a processor part, a data communications part, a local memory and the like (none of which is shown in the figures). For example, the respective DKAs 50 and respective disk drives 40 are connected via a communications network such as an SAN or the like, and data transfer is performed in block units according to a fiber channel protocol. The respective DKAs 50 occasionally monitor the states of the disk drives 40, and the results of this monitoring are transmitted to the SVP 100 via an internal network. Furthermore, the respective CHAs 20 and DKAs 50 are respectively equipped with (for example) printed boards on which the processors, memories and the like are mounted, and control programs that are stored in these memories. The specified functions described later are realized by the joint action of such hardware and software.

The shared memory (or control memory) 60 is constituted for example by a nonvolatile memory. For example, control information and the like is stored in the shared memory 60. Furthermore, information such as control information and the like can be multiplex-managed by a plurality of shared memories 60. A plurality of both shared memories 60 and cache memories 30 can be installed.

The switching part 70 respective connects the respective CHAs 20, the cache memory 30, the respective DKAs 50a and the shared memory 60. As a result, all of the CHAs 20 and DKAs 50, and the cache memory 30 and shared memory 60, can be accessed.

The SVP 100 is respectively connected to the respective managing terminals 2 and 3 via the hub 80. The SVP refers to and updates various types of construction information inside the disk array device 10 via the shared memory 60. Details will be describe later; however, the SLPR construction information table T1 is respectively managed by the SVP 100 and shared memory 60.

Next, an outline of the acquisition of information relating to the SLPRs managed by the respective managers themselves sill be described with reference to FIG. 3. First, the split managers will be described. The split managers access the SVP server part 110 that has the SVP 100 via the managing terminals 2, and send a long-in request by inputting their user IDs into a log-in screen displayed on the display part of each managing terminal 2 (S1).

For example, the SVP server part 110 provides a WWW server function, and can utilize a user ID managing table T2. For example, the user ID managing table T2 assigns a correspondence between user names (root, user1, user2 and the like), the numbers of the SLPRs managed by the respective users (split managers) and the authority of the respective users (SLPR managers, system managers, reference only permitted or the like), and manages this information. Here, furthermore, SLPR numbers are used to specify the SLPRs; however, it would also be possible to use names instead of numbers.

The SVP server part 110 processes log-in requests from the managing terminals 2 (S2). Next, on the basis of the user IDs input from the managing terminals 2, the SVP server part 110 searches the user ID managing table T2, and acquires the numbers (shown as SLPR # in the figures) of the SLPRs managed by the logged-in users (S3). The SVP server part 110 inputs the acquired SLPR numbers into the SVP construction information managing part 120, and request the acquisition of SLPR construction information corresponding to the SLPR numbers (S4).

For example, the SVP construction information managing part 120 is installed inside the SVP 100, and can utilize the SLPR construction information managing table T1. In the SLPR construction information managing table, for examples, SLPR numbers and information relating to the physical resources and logical resources assigned to each SLPR (resource dividing information) are caused to correspond. Examples of resource dividing information include the maximum cache volume that can be used in a given SLPR, information on the ports 21 that can be used by this SLPR, information on logical units (logical volumes) that can be utilized by this SLPR, and information on disk groups that are associated with this SLPR. By searching the SLPR construction information table T1 on the basis of he input SLPR number, the SVP construction information managing part 120 reads out SLPR construction information corresponding to the SLPR number, and transmits this information to the SVP server part 110 (S5).

The SVP server part 110 transmits the SLPR construction information acquired from the SVP construction information managing part 120 to the managing terminal 2 (S6). The managing terminal 2 displays the SLPR construction information received from the SVP server part 110 on the display part of the managing terminal 2. As a result, each split manager can observe and manipulate only information relating to the SLPR managed by this split manager himself. In cases where reference to other SLPRs is not permitted beforehand, the split managers cannot make reference or the like to information relating to SLPRs other than the SLPRs managed by these split managers themselves. Thus, the disk array device 10 is split and managed in SLPR units.

In the case of the system manager as well, this manager acquires construction information for the disk array device 10 managed by this system manager himself via the same process as that used by the split managers. Accordingly, a detailed description of this process will be omitted. However, unlike the split managers, the system manager can acquire construction information for all of the SLPRs contained in the disk array device 10. Furthermore, the SVP server part 110 and SVP construction information managing part 120 are realized by the execution of a specified program in the SVP 100. The system is devised so that SLPR construction information can be acquired by the execution of such programs by the managing clients in the managing terminals 2 and 3.

Figure 4:
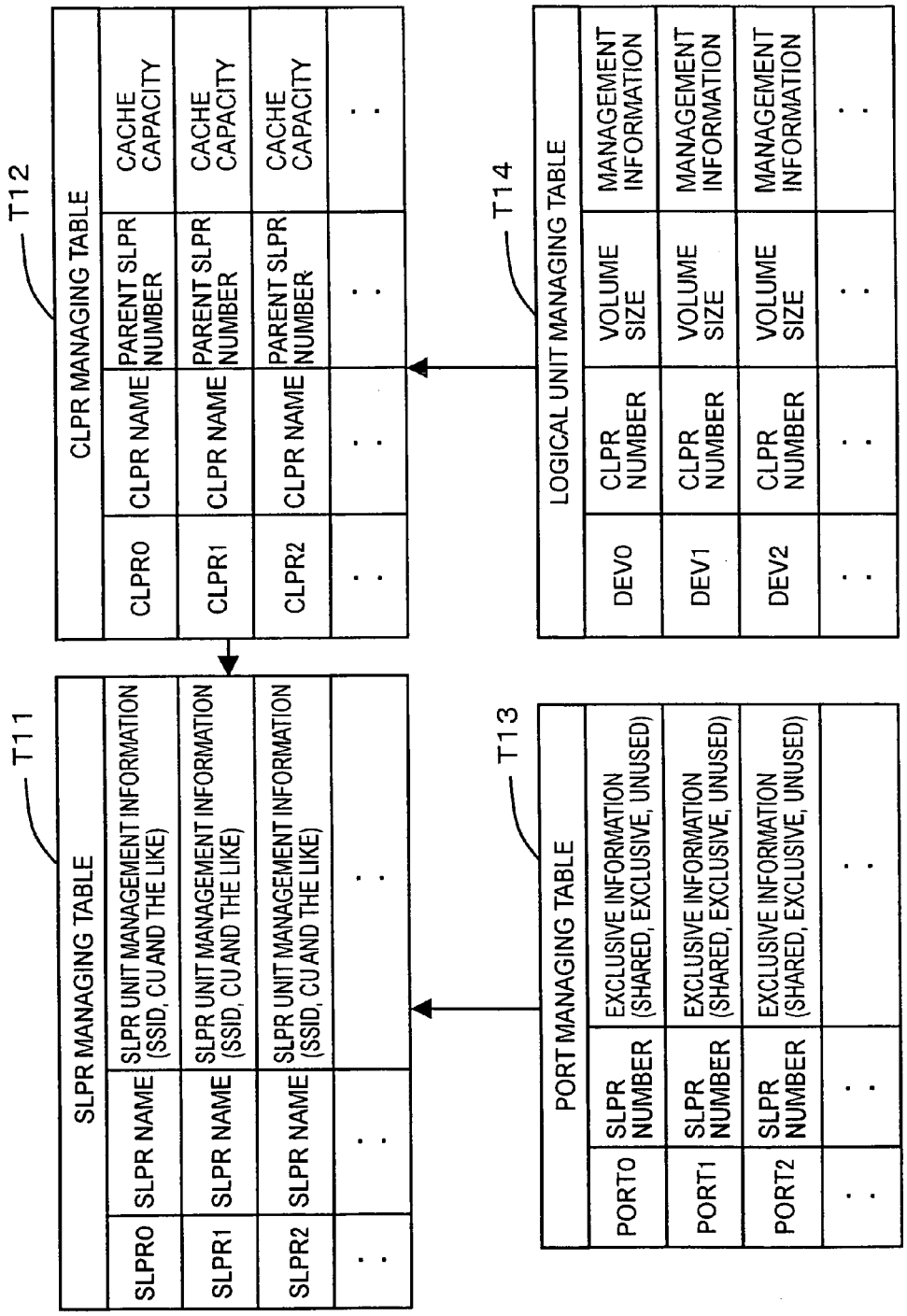
FIG. 4 is an explanatory diagram which shows the construction of respective managing tables that related to the SLPR construction information managing table.

FIG. 4 shows the details of the SLPR construction information managing table T1. For example, the SLPR construction information can be managed using an SLPR managing table T11, a CLPR managing table T12, a port managing table T13 and a logical unit managing table T14.

In the SLPR managing table T11, for example, the name of the SLPR that can be set by the split manager and the various types of information that are managed by this SLPR are caused to correspond to each other for each SLPR. In regard to the SLPR names, unique names can be assigned inside the disk array device 10. The respective SLPRs are specified by means of these SLPR names. Furthermore, examples of the various types of information managed by the SLPRs include SSID (storage subsystem ID), CU (control unit) and the like. SSID is one control unit of the devices in a main frame, and indicates a grouping unit of logical units. CU is one control unit of devices in a main frame; for example, a maximum of 256 logical units can be created within one CU.

In the CLPR managing table T12, for example, the name of the CLPR that can be set by the split manager, the SLPR number (SLPR name) used to specify the SLPR to which this CLPR belongs, and the cache capacity that is assigned to this CLPR, are caused to correspond to each other for each CLPR. It is sufficient if the CLPR names are unique within the disk array device 10; the respective CLPRs can be specified by these CLPR names.

In the port managing table T13, the number of the SLPR (name of the SLPR) to which the port belongs and the attributes set for this port are caused to correspond to each other for each port. As was described above, examples of port attributes include exclusive ports, shared ports, unused ports and the like. In the copying ports shown in FIG. 1, these attributes are attributes used for convenience of description in order to illustrate the ports used for remote copying among the exclusive ports; in actuality, the port attribute of "copying port" is not prepared beforehand.

In the logical unit managing table T14, or example, the number of the CLPR (name of the CLPR) to which the logical unit belongs, the volume size and the management information are caused to correspond to each other for each logical unit. Examples of management information include information for specifying the disk drive group in which the logical unit is formed and the like. The SLPR construction information can be managed using the respective managing tables T11 through T14. Furthermore, the table constructions are not limited to the above constructions.

Figure 5:
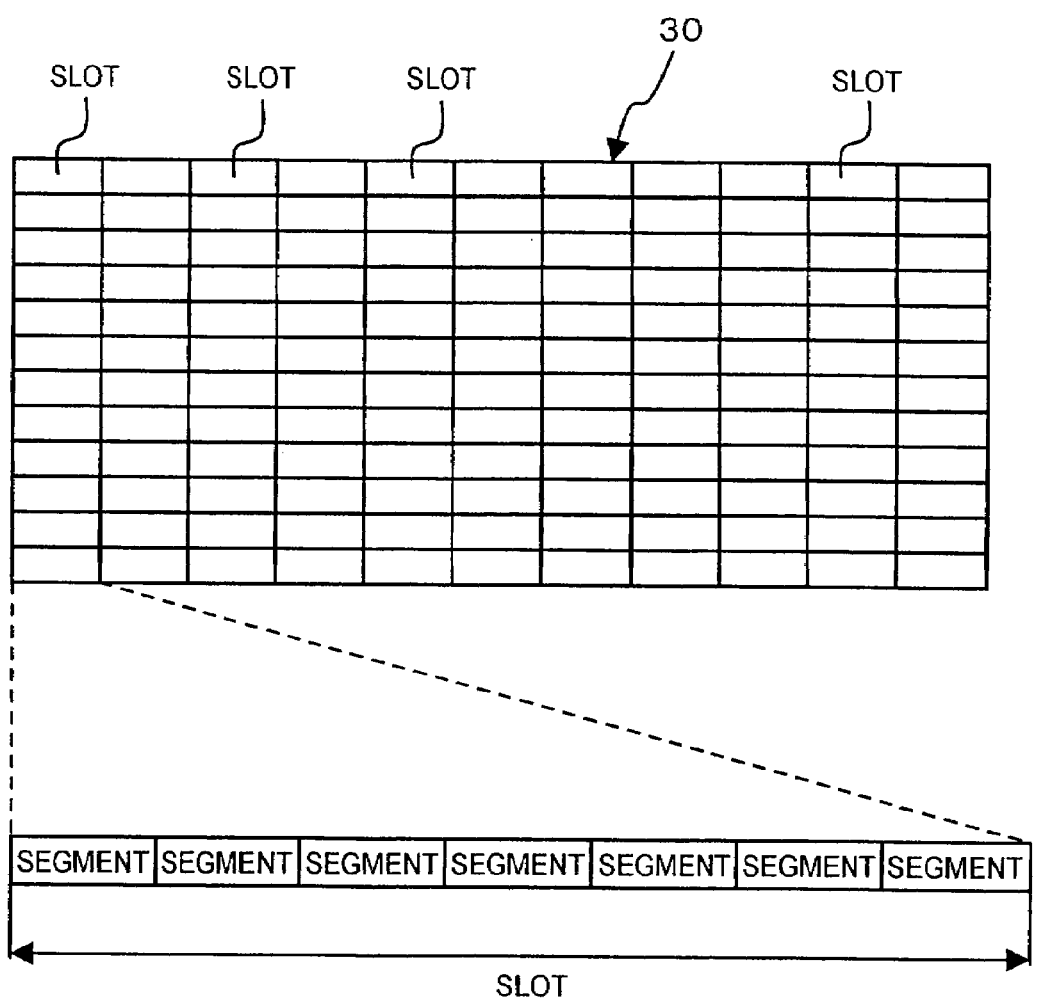
FIG. 5 is an explanatory diagram which shows an outline of the memory structure of the cache memory.

Next, the management method of the cache memory 30 will be described. As is shown in FIG. 5, the cache memory 30 is split into logical dividing units called slots. Each slot is further split into logical dividing units called segments. The cache capacity is assigned to the respective CLPRs in slot units. Meanwhile, in the CLPR managing table T12 shown in FIG. 4, the cache capacity is managed in segment units.

Figure 6:
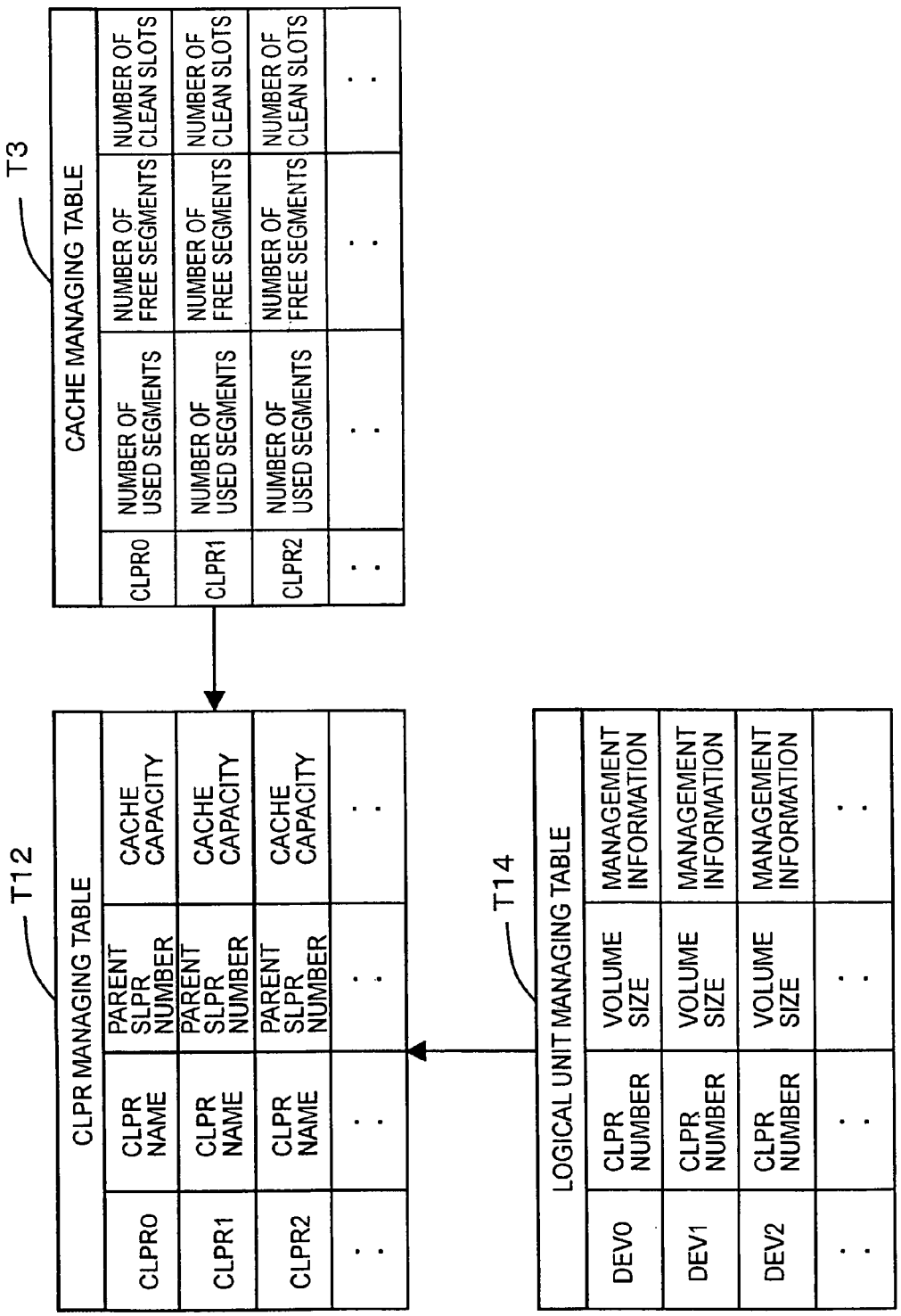
FIG. 6 is an explanatory diagram which shows the construction used to manage the cache capacity or the respective CLPRs.

As is shown in FIG. 6, the number of segments currently being used in each CLPR, the number of free segments (which indicates the number of unused segments) and the number of slots storing clean data among the segments in use are caused to correspond to each other in the cache managing table T3. As was already described above, clean data refers to data that has already been written into the disk drives 40 among the write data from the host computer 1, or data that has been read out from the disk drives 40; this data does not require redundant management. Accordingly, clean data can be eliminated or released from slots that store only clean data. Like the other tables, this cache managing table T3 can be stored in the shared memory 60 or in the shared memory 60 and SVP 100.

The cache managing table T3 and CLPR managing table T12 are associated with each other, so that the cache capacity that can be used in each CLPR can easily be determined.

Figure 7:
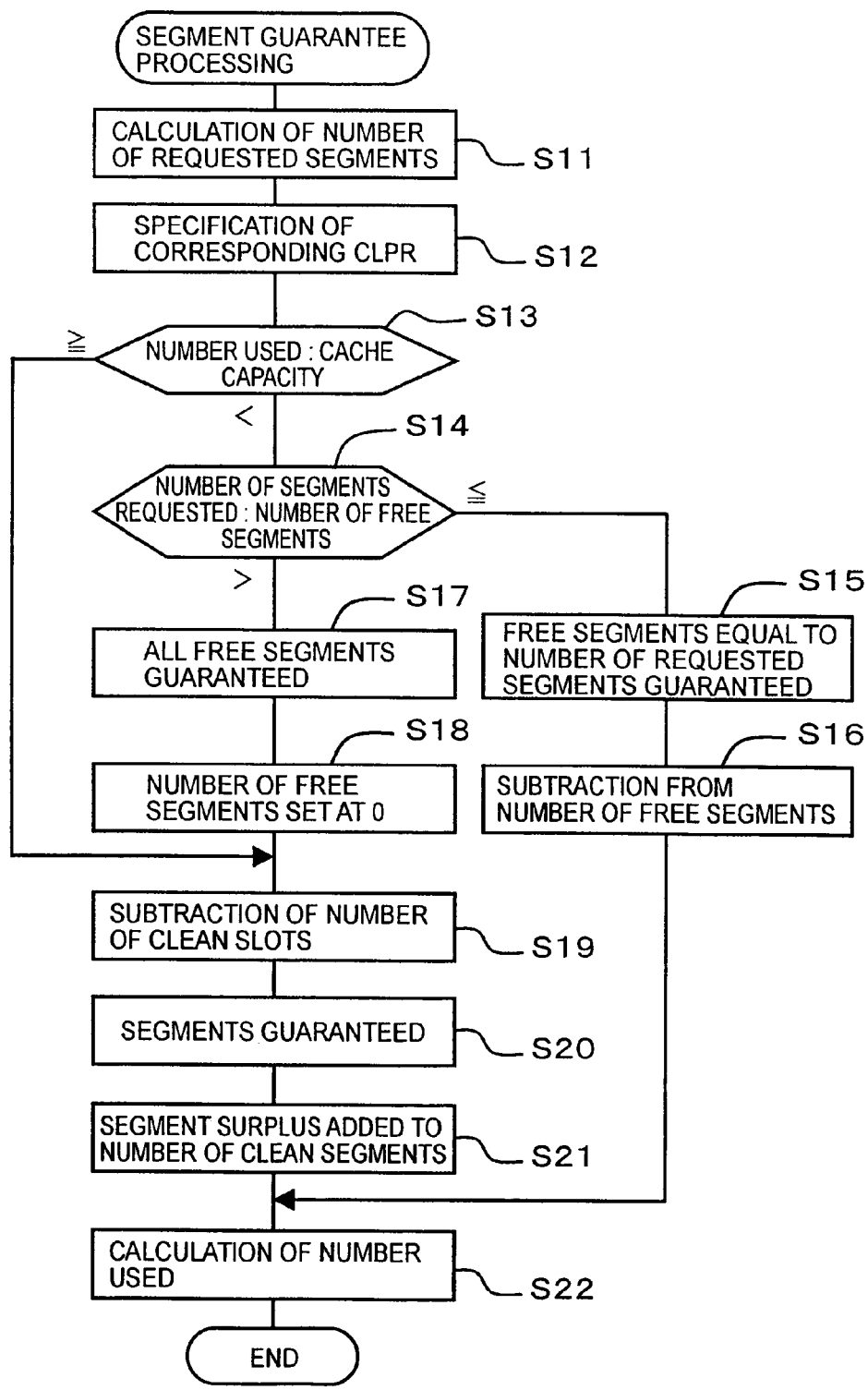
FIG. 7 is a flow chart which shows the segment guarantee processing.

FIG. 7 is a flow chart showing an outline of the segment guarantee processing used to assign segments to the respective CLPRs. This processing can be executed by a cache control program stored in the CHAs 20 or DKAs 50. In cases where segments are guaranteed according to write requests from the host computer 1, the CHAs 20 execute this processing. In cases where segments are guaranteed according to read requests from the host computer 1, the DKAs 50 execute this processing. In the following description, a cases in which the processing is executed by the CHAs 20 will be taken as an example.

When a write request or read request is issued by the host computer 1, the CHA 20 in question calculates the number of segments required for the processing of this request (S11). Next, the CHA 20 specifies the corresponding CLPR on the basis of the information for the logical unit for which access was requested by the host computer 1 (S12).

When the CLPR is specified, the CHA 20 next compares the number of segment in used managed by the cache managing table T3 and the cache capacity managed by the CLPR managing table T12 (S13). Cases in which the number of segments in use is smaller than the cache capacity of the CLPR (number of segments used<cache capacity) are cases in which empty segments are present. Accordingly, the CHA 20 compares the number of requested segments calculated in S11 with the number of free segments (S14). In cases where the number of requested segments is equal to or less than the number of free segments (number of requested segments≦number of free segments), the CHA 20 guarantees a number of free segments that is equal to the number of requested segments (S15). Then, the CHA 20 subtracts the number of guaranteed segments from the number of free segments in the cache managing table T3, thus updating the table (S16). Similarly, furthermore, the CHA 20 adds the number of guaranteed segments to the number of segments in use in the cache managing table T3, so that the table is updated. As a result, this processing is ended.

On the other hand, in cases where the number of requested segments is greater than the number of free segments (number of requested segments>number of free segments), the CHA 20 guarantees all of the free segments that can be used by the CLPR in question (S17). In this case, the number of free segments in the cache managing table T3 is updated to "0" (S18).

Next, it is necessary to guarantee the segments constituting the deficit that cannot be supplied by all of the guaranteed free segments alone. Accordingly, the CHA 20 calculates the number of clean slots corresponding to the number of segments that are lacking (S19), and releases segments equal to or greater than the necessary quantity. The CHA 20 guarantees the required segments from these released segments (S20). The CHA 20 adds segments that remain when the segments have been guaranteed from the released slots to the free segments (S21). Then, the CHA 20 adds the number of requested segments to the number of segments in use in the cache managing table T3, so that this table is updated (S22), and this processing is ended.

Meanwhile, in cases where the number of requested segments required in order to process the request from the host computer 1 is equal to or greater than the cache capacity (number of requested segments≧cache capacity), the CHA 20 releases a number of clean slots corresponding to the number of requested segments (S19), and guarantees a number of segments equal to the number of requested segments (S20). Then, the CHA 20 adds the number of surplus segments to the number of free segments (S21), and increases the number of segments in use by the number of requested segments (S22), and this processing is ended.

Next, the remote copying control method of the present embodiment will be described. First, to describe a simple outline, in cases where data is to be transferred to the remote system 5 from the disk array device 10, the data and management information written from the host computer 1 is temporarily stored in the cache memory 30. Then, this data and management information are transmitted from the cache memory 30 to the remote system 5 via the CHA 20 and communications networks CN2 and CN3. When the remote system 5 receives data from the disk array device 10, this received data is stored in the cache memory inside the remote system 5. Then, the remote system 5 writes the data stored in the cache memory into the disk drive. At the point in time at which the data has been stored in the cache memory, the remote system 5 can report the completion of writing to the disk array device 10. The timing of the writing of data into the disk drive inside the remote system 5 is not synchronized with the timing of data storage in the cache memory inside the remote system 5.

In the case of synchronous remote copying, the data for which writing was requested by the host computer 1 is transferred from the disk array device 10 to the remote system 5, and at the point in time at which a writing completion report is received from the remote system 5, the disk array device 10 reports the completion of writing to the host computer 1. Accordingly, in the case of synchronous remote copying, since a response delay is generated until the writing completion report is received from the remote system 5, this system is suitable for use in cases where the distance between the remote system 5 and the disk array device 10 constituting the local system is relatively short. Meanwhile, in the case of synchronous remote copying, since the completion of writing is reported to the host computer 1 after it has been confirmed that the data has been received by the remote system 5, the reliability is high.

On the other hand, in the case of asynchronous remote copying, the completion of writing is reported to the host computer 1 at the point in time at which the data for which writing was requested by the host computer 1 is stored in the cache memory 30 of the disk array device 10. After reporting the completion of writing to the host computer 1, the disk array device 10 transmits the write data to the remote system 5. Accordingly, in the case of asynchronous remote copying, since the completion of writing can be immediately reported to the host computer 1, the response speed can be set at a higher speed than in the case of synchronous remote copying. Furthermore, since the problem of a response delay does not arise, this system is suitable for use in cases where the distance between the disk array device 10 and the remote system 5 is great. However, in the case of asynchronous remote copying, since the completion of writing is reported to the host computer 1 before the data is transferred to the remote system 5, the reliability is low compared to that of synchronous remote copying. Furthermore, in both synchronous and asynchronous remote copying, data is transferred directly to the remote system 5 from the disk array device 10 without placing a processing burden on the host computer 1.

Figure 8:
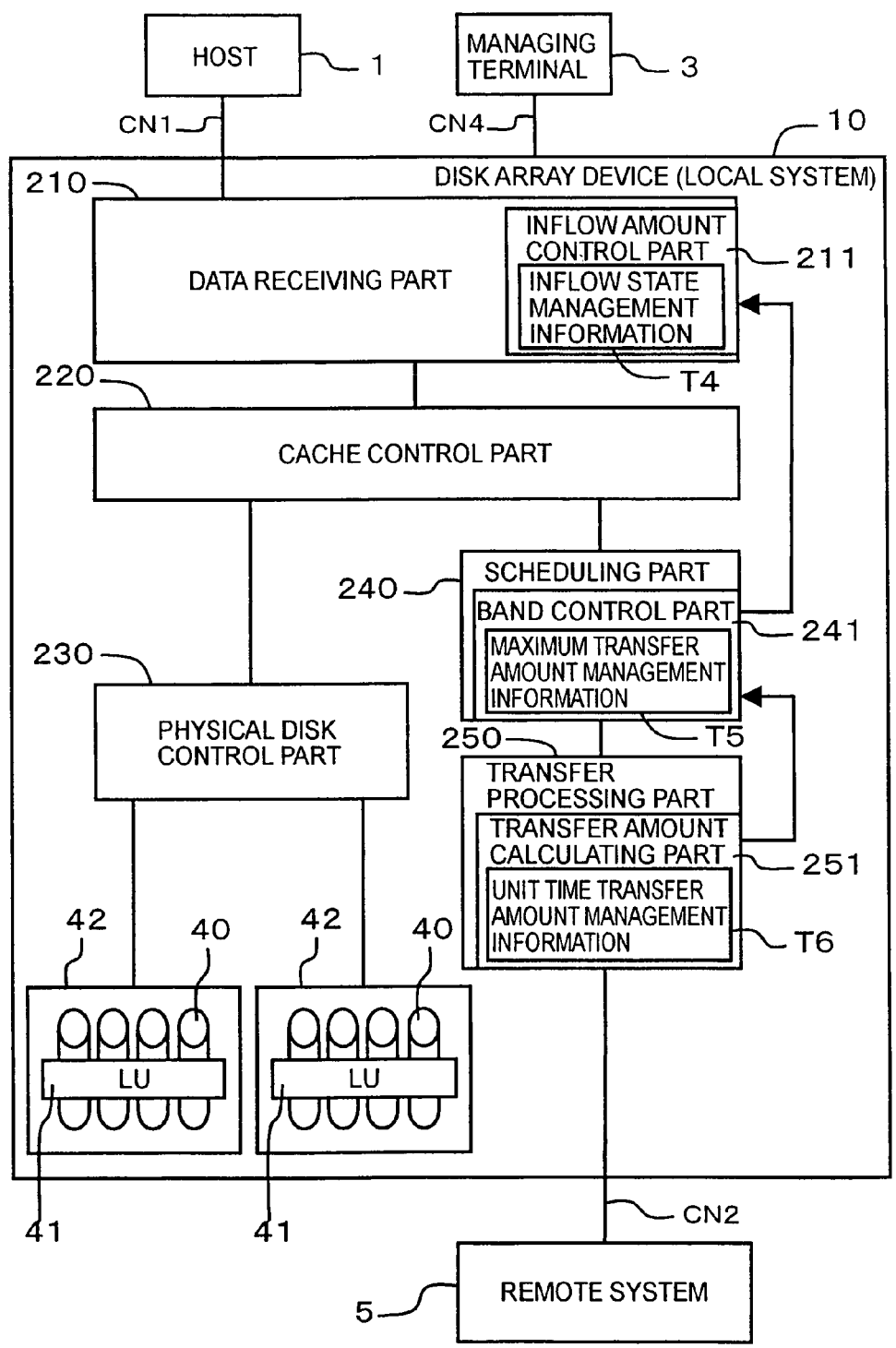
FIG. 8 is an explanatory diagram which shows the construction of the respective functions relating to the remote copying of the disk array device.

FIG. 8 is a schematic block diagram which shows the functional construction of the disk array device 10 with a focus on remote copying. In regard to the execution of remote copying from the disk array device 10 to the remote system 5, this is executed by the data receiving part 210, cache control part 220, physical disk control part 230, scheduling part 240 and transfer processing part 250 inside the disk array device 10.

The CHA 20 can be caused to function as the data receiving part 210 by causing a program that is used to control the reception of data to be executed by the processor inside the CHA 20. The data receiving part 210 receives and processes write requests from the host computer 1. An inflow amount control part 211 which is used to limit the amount of inflow from the host computer 1 is installed inside the data receiving part 210. As will be described later, the inflow amount control part 211 restricts write requests from the host computer 1 by deliberately delaying the time of the reporting of the completion of writing to the host computer 1 by a preset time.

The cache control part 220 performs processing that causes the data received by the data receiving part 210 to be stored temporarily in the cache memory 30. The cache control part 220 can also temporarily store data that is read out from the disk drive 40. The CHA 20 or DKA 50 can be caused to function as the cache control part 220 by causing a cache control program to be executed by the processor inside the CHA 20 or DKA 50.

The physical disk control part 230 writes the data stored in the cache memory 30 into a specified position in the disk drive 40 by performing a conversion operation from logical addresses to physical addresses or the like. Furthermore, the physical disk control part 230 stores data read out from the disk drive 40 in the cache memory 30 by performing a conversion operation from physical addresses to logical addresses or the like. The DKA 50 can be caused to function as the physical disk control part 230 by causing a disk control program to be executed by the processor inside the DKA 50.

The scheduling part 240 determines whether or not the current time is the time for executing remote copying. The CHA 20 can be caused to function as the scheduling part 240 by causing a remote copying schedule management program to be executed by the processor of the CHA 20. As is described below, a band control part 241 is installed in the scheduling part 240. Furthermore, remote copying may be performed each time that a write request is sent out from the host computer 1; alternatively, remote copying may be performed at the point in time at which the amount of updated data reaches a specified amount, or remote copying may be performed using a combination of both systems.

The transfer processing part 250 transfers data to the remote system 5 via the communications network CN2 or the like. The CHA 20 can be caused to function as the transfer processing part 250 by causing a transfer processing program to be executed by the processor inside the CHA 20. As is described below, a transfer amount calculating part 251 is installed in the transfer processing part 250.

Here, the execution of remote copying may be set for all of the logical units 41 inside the SLPR, or the system may be set so that remote copying is executed for only some of the logical units 41. The setting of remote copying can be accomplished by the split manager managing the SLPR.

In cases where there is a write request from the host computer 1 for a logical unit 41 that is the object of remote copying, the data receiving part 210 indicates to the cache control part 220 that the data is data that is the object of remote copying, and transfers this data to the cache control part 220. The cache control part 220 stores the data for which writing has been requested in a cache region that can be used by the SLPR in question.

The scheduling part 240 is periodically activated, and requests to the cache control part 220 the acquisition of data that is the object of remote copying stored in the cache memory 30. The cache control part 220 investigates whether or not data that is the object of remote copying is stored in the cache memory 30, and in cases where data that is the object of remote copying is present, the cache control part 220 outputs this data to the scheduling part 240. The scheduling part 240 inputs the data transferred from the cache control part 220 into the transfer processing part 250. The transfer processing part 250 transfers the data acquired from the scheduling part 240 to the remote system 5 from a specified port via the communications network CN2 or the like.

A transfer amount calculating part 251 is installed in the transfer processing part 250. This transfer amount calculating part 251 calculates the amount of data that is transferred within the unit time. The amount of data transferred within the unit time is managed for each of the SLPRs by this transfer amount calculating part. As will be described later, the amount of data transferred within the unit time is managed by means of unit time transfer amount management information T6.

A band control part 241 is installed in the scheduling part 240. The band control part 241 compares the amount of data that is transferred within the unit time for each of the SLPRs, as detected by the transfer amount calculating part 251, with a maximum transfer amount for each SLPR which is set by the system manager beforehand, and controls the assignment of communications resources used in remote copying for each SLPR on the basis of the relationship of these two values. The maximum transfer amount, which is set beforehand for each SLPR, and which can be altered by the system manager, is managed by means of maximum transfer amount management information T5. In cases where the amount of data transferred within the unit time exceeds the maximum transfer amount, the band control part 241 stops the transfer, and performs processing for the next set of data that is the object of remote copying. Furthermore, the band control part 241 indicates the initiation of inflow limitation to the inflow amount control part 211 installed inside the data receiving part 210. In cases where the amount of data transferred within the unit time is less than the maximum transfer amount, the band control part 241 indicates a release of the inflow limitation to the inflow amount control part 211.

When the initiation of inflow limitation is indicated by the band control part 241, the inflow amount control part 211 records an indication of "inflow limited" in the inflow state management information T4 for the SLPR for which inflow limitation was indicated. Conversely, when the inflow amount control part 211 is notified of the release of inflow limitation by the band control part 241, the inflow amount control part 211 releases this inflow limitation for the SLPR for which inflow limitation was set, and updates the inflow state management information T4.

When the data receiving part 210 receives a write request from the host computer 1, the data receiving part 210 refers to the inflow state management information T4, and judges whether or not inflow limitation is set for the SLPR corresponding to the write request. In cases where inflow limitation is not set, the data receiving part 210 performs an ordinary operation. Specifically, the data receiving part 210 writes the data received from the host computer 1 into the cache memory 30 via the cache control part 220. Then, at the point in time at which the data is stored in the cache memory 30, the data receiving part 210 reports the completion of writing to the host computer 1. Conversely, in cases where inflow limitation is set for the SLPR for which writing has been requested by the host computer 1, the data receiving part 210 can restrict the amount of data that flows into the SLPR from the host computer 1 by delaying the reporting of the completion of writing to the host computer 1 by a response delay time that is set beforehand by the system manager.

The structures of the respective types of management information T4 through T6 will be described with reference to FIG. 9. As is shown in FIG. 9 (a), the inflow state management information T4 that is used by the inflow amount control part 211 can be constructed by causing the SLPR numbers (SLPR names) of the respective SLPRs, status information relating to inflow control (band control) for each SLPR, and response delay times, to correspond to each other. For instance, "inflow limited" may be cited as an example of such status information.

As is shown in FIG. 9 (b), the maximum transfer amount management information T5 that is used by the band control part 241 can be constructed (for example) by causing the SLPR numbers of the respective SLPRs and the maximum transfer amounts (DTmax) for the respective SLPRs to correspond to each other.

As is shown in FIG. 9 (c), the transfer amount management information T6 that is used by the transfer amount calculating part 251 can be constructed (for example) by causing the SLPR numbers of the respective SLPRs and the amounts of data transferred within the unit time (DT) for the respective SLPRs to correspond to each other.

Figure 10:
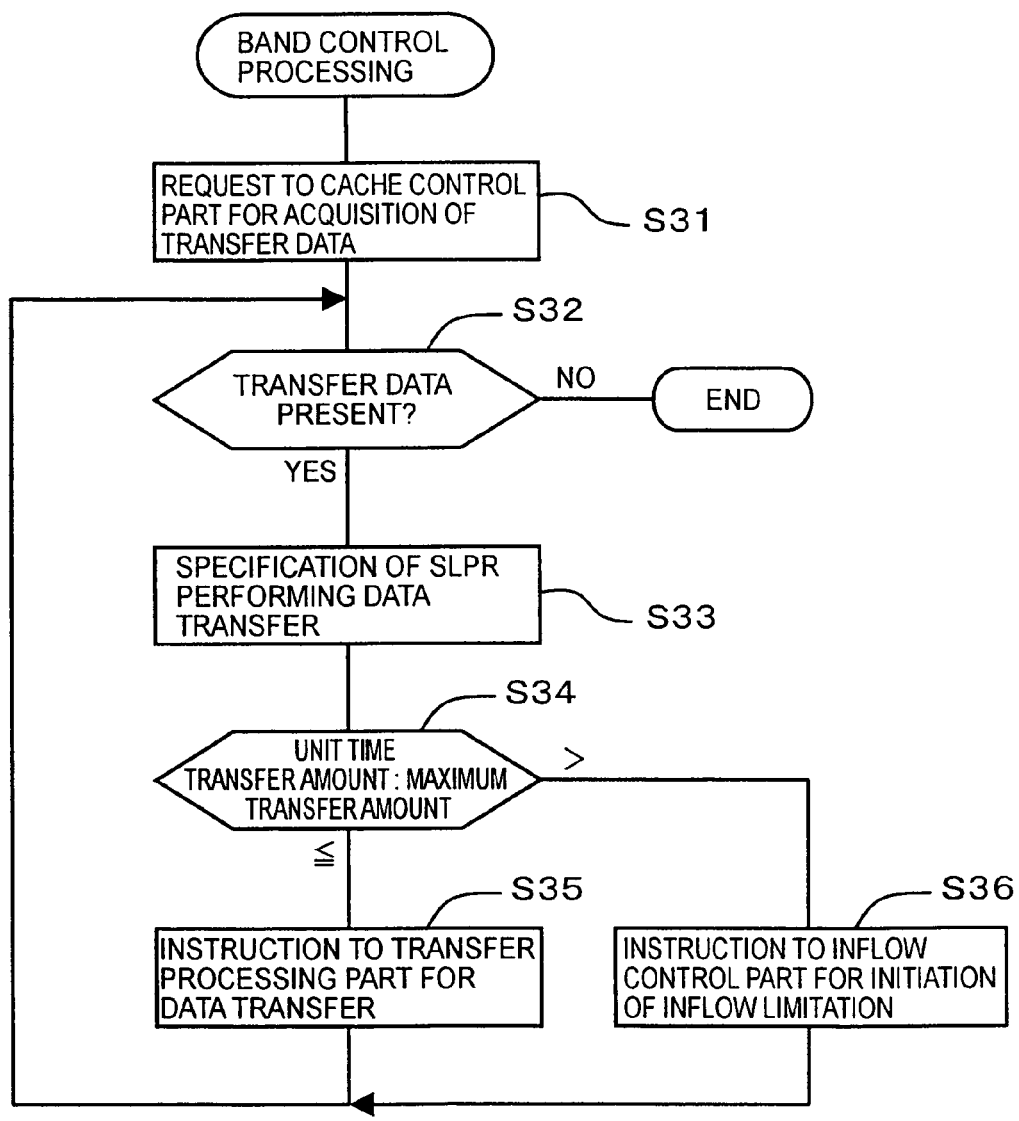
FIG. 10 is a flow chart which shows the band control processing.

FIG. 10 is a flow chart which shows an outline of the band control processing executed by the band control part 241. The band control part 241 sends a request to the cache control part 220 for the acquisition of data that is the object of remote copying (S31). In cases where no data that is to be transferred to the remote system 5 is present (S32: NO), the band control part 241 ends the processing.

In cases where data that is the object of transfer (data that is the object of remote copying) is present (S32: YES), the band control part 241 specifies the SLPR for which remote copying is to be performed (S33). The band control part 241 acquires the amount of data transferred within the unit time for the specified SLPR from the transfer amount calculating part 251, and compares this amount of data transferred within the unit time and the maximum transfer amount that has been set beforehand for the specified SLPR (S34). In cases where the amount of data transferred within the unit time is equal to or less than the maximum transfer amount (amount of data transferred within unit time≦maximum transfer amount), the band control part 241 instructs the transfer processing part 251 to transfer data to the remote system 5 (S35), and proceeds to the processing of the next set of data that is the object of remote copying. In this case, in other words, remote copying is accomplished by an ordinary operation.

In cases where the amount of data transferred within the unit time for the specified SLPR is greater than the maximum transfer amount set beforehand (amount of data transferred within unit time>maximum transfer amount), the band control part 241 instructs the inflow amount control part 211 to set inflow limitation for the specified SLPR (S36), and proceeds to the processing of the next set of data that is the object of remote copying. Then, in cases where processing has been completed for all of the sets of data that are the object of remote copying, a judgement of "NO" is made in S32, and this processing is ended.

Figure 11:
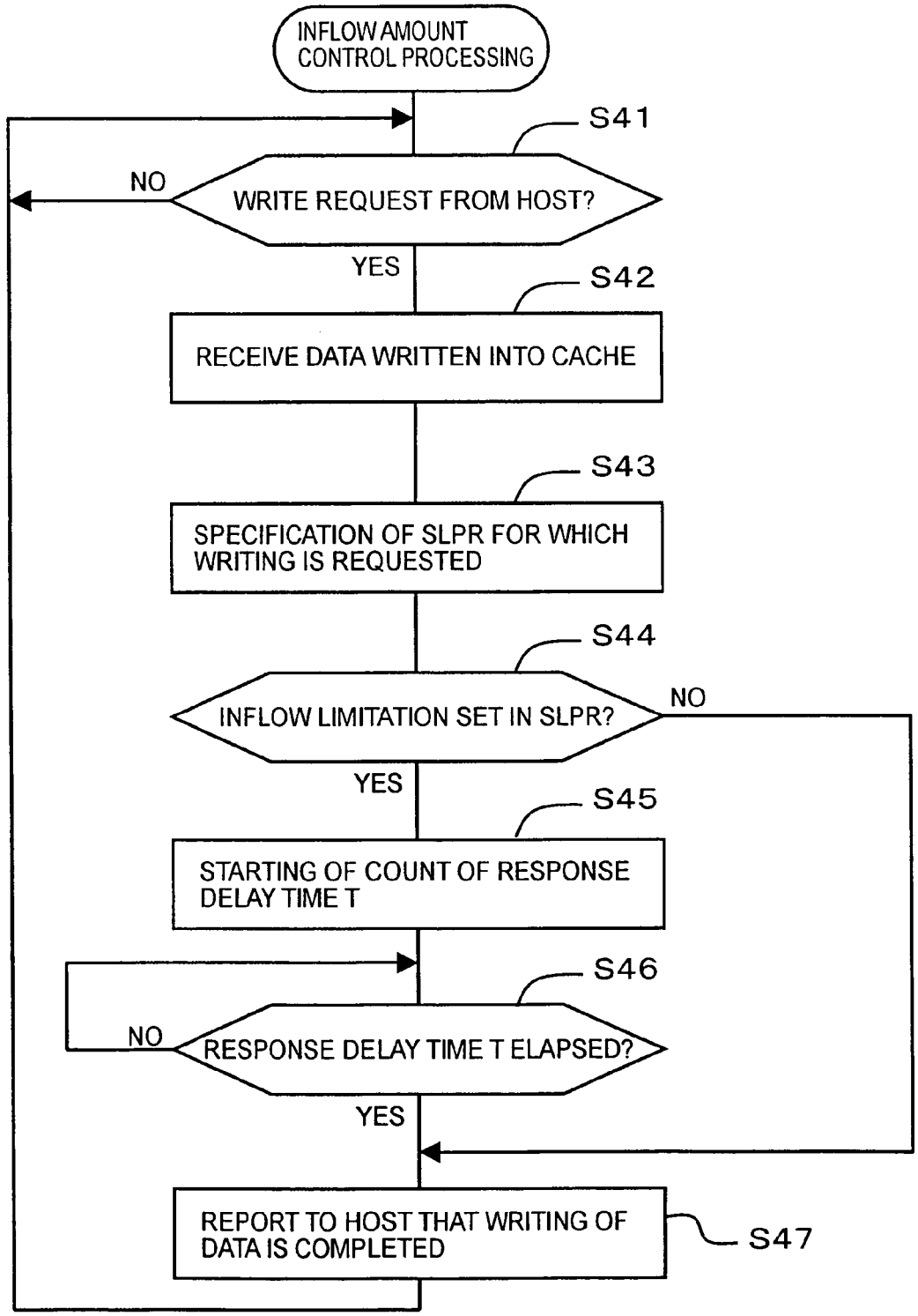
FIG. 11 is a flow chart which shows the inflow amount control processing.

FIG. 11 is a flow chart which shows an outline of the inflow amount control processing that is executed by the data receiving part 210 (and inflow amount control part 211). When a write request is generated by the host computer 1 (S41: YES), the data receiving part 210 stores the data received from the host computer 1 in the cache memory 30 via the cache control part 220 (S42), and specifies the SLPR corresponding to the write request (S43). Next, the data receiving part 210 refers to the inflow state management information T4, and judges whether or not inflow limitation is set for the specified SLPR (S44).

In cases where inflow limitation is wet (S44: YES), the data receiving part 210 acquires the response delay time set for this SLPR from the inflow state management information T4, and initiates a measurement of the response delay time (S45). When the response delay time has elapsed (S46: YES), the data receiving part 210 reports the completion of writing to the host computer 1 (S47). On the other hand, in cases where inflow limitation is not set for the SLPR (S44: NO), the data receiving part 210 immediately reports the completion of writing to the host computer 1 without any deliberate delay of the response (S47).

Figure 12:
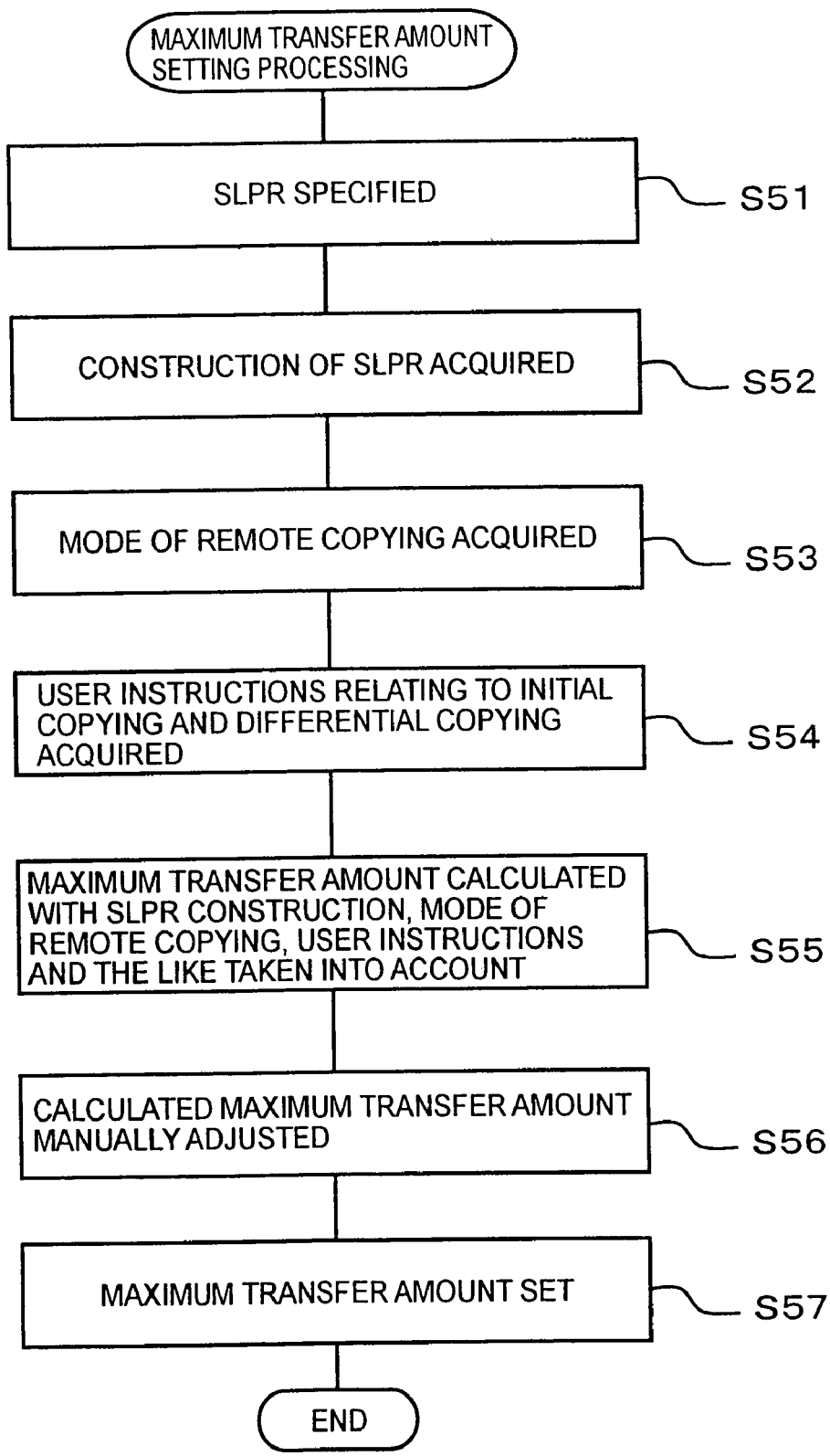
FIG. 12 is a flow chart which the maximum transfer amount setting processing.

FIG. 12 is a flow chart which shows an outline of the processing that is used to set the maximum transfer amounts of the respective SLPRs. For example, this processing can be operated via the managing terminal 3 used by the system manager. First, via the managing terminal 3, the system manager specifies the SLPR for which the maximum transfer amount is to be set (S51). Next, the maximum transfer amount setting support program executed by the SVP 100 (or managing terminal 3) acquires the SLPR construction information (S52), mode of remote copying (S53), and user instructions relating to initial copying and differential copying (S54).

Here, for example, the modes of remote copying include the asynchronous remote copying mode and synchronous remote copying mode. Furthermore, the user instructions relating to initial copying and differential copying may include instructions as to whether or not preference is to be given to a quick transition to a recoverable state by ending the initial copying early or the like.

The maximum transfer amount setting support program calculates the maximum transfer amount that is to be set for the SLPR, while taking into account the SLPR construction information, mode of remote copying, user instructions and the like (S55). For example, this maximum transfer amount can be calculated by the appropriate weighting of various parameters or the like. As one example, this maximum transfer amount can be calculated according to the quantity of resources (logical unit volume size, cache capacity or the like) assigned to the SLPR, so that the maximum transfer amount increases as the quantity of resources increase. Furthermore, for example, in the case of the synchronous remote copying mode, a large maximum transfer amount is calculated so that the response time can be minimized. Furthermore, for example, in cases where the early completion of initial copying is instructed by the user, this maximum transfer amount can be calculated so that the maximum transfer amount that is used when initial copying is performed is large.

Here, the maximum transfer amount (band) can be respectively set for each operating mode, as in synchronous remote copying/asynchronous remote copying or initial copying/ differential copying. Furthermore, the maximum transfer amount can also be respectively set in volume units or in group units constructed from a plurality of volumes.

The maximum transfer amount thus calculated with various parameters taken into account is displayed on the display part of the managing terminal 3. The system manager can manually adjust the calculated maximum transfer amount (S56). Then, the maximum transfer amount that is finally approved by the system manager is registered in the maximum transfer amount management information T5 (S57). Furthermore, the calculation of the maximum transfer amount is not limited to the above example. For instance, it is not necessary to take all of the abovementioned parameters (quantity of resources assigned to the SLPR, remote copying mode, user instructions relating to initial copying and the like) into account; the maximum transfer amount can be calculated and set on any one or plurality of such parameters.

In the present embodiment constructed as described above, the disk array device 10 can be split into respective SLPRs for respective users and thus provided to respective users; furthermore, the communications resources used for remote copying can be assigned to the respective split units (SLPRs).

Accordingly, the respective SLPRs can also be separated with respect to the remote copying, so that the mutual effects between respective businesses (respective host computers) can be reduced. Specifically, for example, even in cases where access requests relating to a certain business increase, so that the amount of data that is to be transferred to the remote system 5 from this SLPR is increased, the almost complete occupation of the communications network CN2 to the remote system 5 by this SLPR can naturally be prevented. Accordingly, appropriate bands can be assigned to the respective SLPRs prior to input into the switch 4, so that interference between respective users can be prevented, thus making it possible to provide a much more stable business environment.

Furthermore, the present invention is not limited to the embodiment described above. Various additions, alterations and the like may be made within the scope of the present invention by a person skilled in the art. For example, in the abovementioned embodiment, a system was described in which data inflow from the host computer was limited by a specified response delay time in cases where the amount of data transferred within the unit time exceeded the preset maximum transfer amount. However, the method used for band control is not limited to this; various methods may be employed. For example, the differential value of the transfer amount may be compared with a preset standard value, and data inflow from the host computer may be limited in cases where an abrupt increase in the transfer amount is detected.

FIG. 1
1A HOST (FIRM A)
1B HOST (FIRM B)
1C HOST (FIRM C)
4 SWITCH
5 REMOTE SYSTEM
21A EXCLUSIVE PORT
21B EXCLUSIVE PORT
21C COPYING PORT
21D EXCLUSIVE PORT
21E COPYING PORT
21F COMMON PORT
21G PORT
21H PORT
30A CACHE MEMORY
30B CACHE MEMORY
30C CACHE MEMORY

30D CACHE MEMORY
2A MANAGING TERMINAL (FOR SPLIT MANAGEMENT)
2B MANAGING TERMINAL (FOR SPLIT MANAGEMENT)
2C MANAGING TERMINAL (FOR SPLIT MANAGEMENT)
3 MANAGING TERMINAL (FOR SYSTEM MANAGEMENT)

FIG. 2
1 HOST
2 MANAGING TERMINAL
3 MANAGING TERMINAL
4 SWITCH
5 REMOTE SYSTEM
80 HUB
T1 CONSTRUCTION INFORMATION
21 PORT
60 SHARED MEMORY
T1 CONSTRUCTION INFORMATION
70 SWITCHING PART
30
CACHE MEMORY
DIRTY DATA
CLEAN DATA
DISK ARRAY DEVICE (LOCAL SYSTEM)

Figure 3:
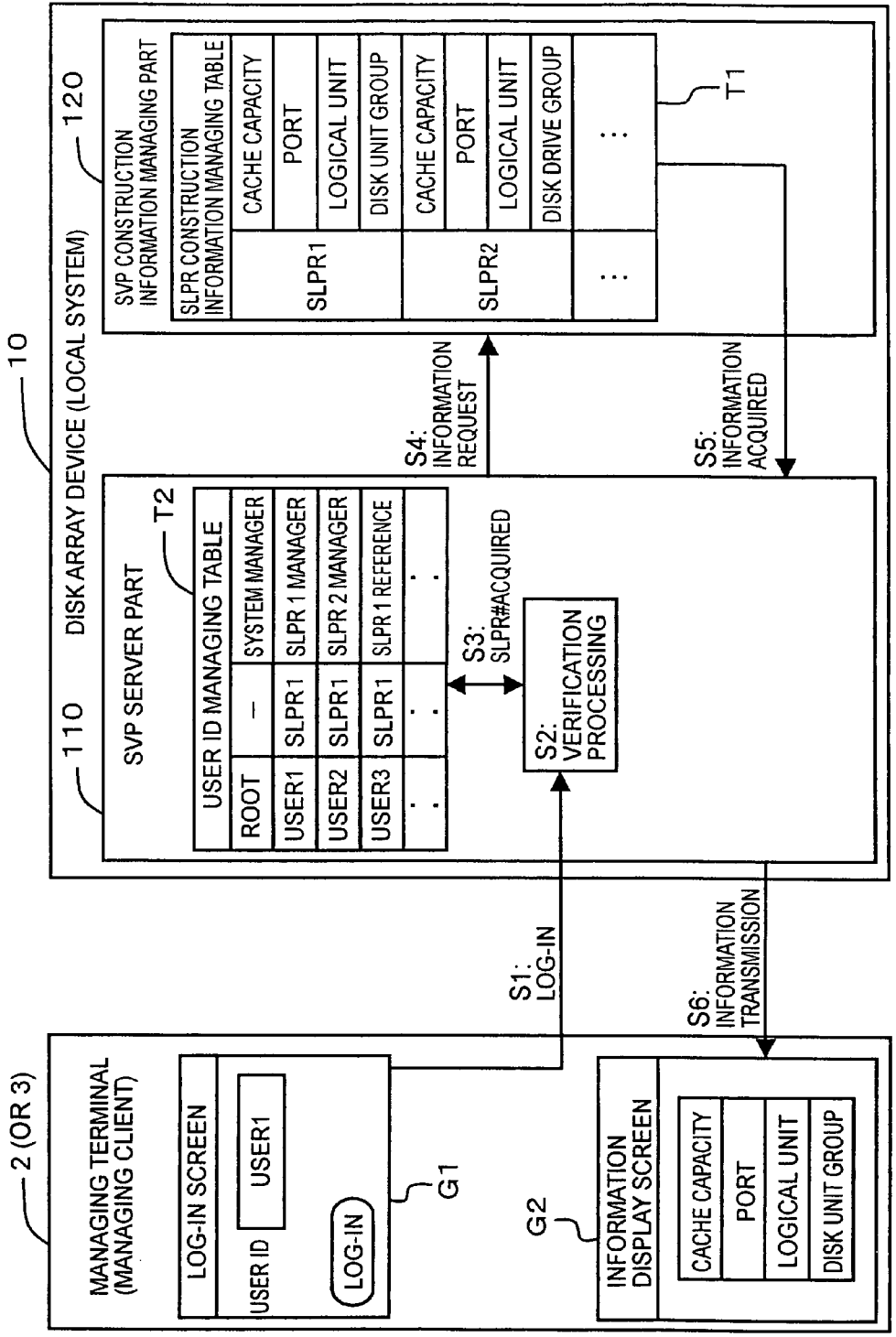
FIG. 3 is an explanatory diagram which shows how resources are managed by dividing the resources for the respective SLPRs.

FIG. 3
2 (OR 3)
MANAGING TERMINAL (MANAGING CLIENT)
G1 LOG-IN SCREEN
LOG-IN
G2 INFORMATION DISPLAY SCREEN
CACHE CAPACITY
PORT
LOGICAL UNIT
DISK UNIT GROUP
S1 LOG-IN
S6 INFORMATION TRANSMISSION
10 DISK ARRAY DEVICE (LOCAL SYSTEM)
110 SVP SERVER PART
T2 USER ID MANAGING TABLE
SYSTEM MANAGER
SLPR 1 MANAGER
SLPR 2 MANAGER
SLPR 1 REFERENCE
S3: SLPR # ACQUIRED
S2: VERIFICATION PROCESSING
S4: INFORMATION REQUEST
S5: INFORMATION ACQUIRED
120 SVP CONSTRUCTION INFORMATION MANAGING PART
SLPR CONSTRUCTION INFORMATION MANAGING TABLE
CACHE CAPACITY
PORT
LOGICAL UNIT
DISK UNIT GROUP
CACHE CAPACITY
PORT
LOGICAL UNIT
DISK DRIVE GROUP

FIG. 4
T111 SLPR MANAGING TABLE
SLPR NAME [REPEATED]
SLPR UNIT MANAGEMENT INFORMATION (SSID, CU AND THE LIKE) [REPEATED]
T12 CLPR MANAGING TABLE
CLPR NAME [REPEATED]
NEW SLPR NUMBER [REPEATED]
CACHE CAPACITY [REPEATED]
T13 PORT MANAGING TABLE
SLPR NUMBER [REPEATED]
EXCLUSIVE INFORMATION (SHARED, EXCLUSIVE, UNUSED) [REPEATED]
T14 LOGICAL UNIT MANAGING TABLE
CLPR NUMBER [REPEATED]
VOLUME SIZE [REPEATED]
MANAGEMENT INFORMATION [REPEATED]

FIG. 5
SLOT [REPEATED]
SEGMENT [REPEATED]
SLOT

FIG. 6
T12 CLPR MANAGING TABLE
CLPR NAME [REPEATED]
NEW SLPR NUMBER [REPEATED]
CACHE CAPACITY [REPEATED]
T3 CACHE MANAGING TABLE
NUMBER OF UNUSED SEGMENTS [REPEATED]
NUMBER OF FREE SEGMENTS [REPEATED]
NUMBER OF CLEAN SLOTS [REPEATED]
T14 LOGICAL UNIT MANAGING TABLE
CLPR NUMBER [REPEATED]
VOLUME SIZE [REPEATED]
MANAGEMENT INFORMATION [REPEATED]

FIG. 7
SEGMENT GUARANTEE PROCESSING
S11 CALCULATION OF NUMBER OF REQUESTED SEGMENTS
S12 SPECIFICATION OF CORRESPONDING CLPR
S13 NUMBER USED : CACHE CAPACITY
S14 NUMBER OF SEGMENTS REQUESTED : NUMBER OF FREE SEGMENTS
S15 FREE SEGMENTS EQUAL TO NUMBER OF REQUESTED SEGMENTS GUARANTEED
S16 SUBTRACTION FROM NUMBER OF FREE SEGMENTS
S17 ALL FREE SEGMENTS GUARANTEED
S18 NUMBER OF FREE SEGMENTS SET AT 01
S19 SUBTRACTION OF NUMBER OF CLEAN SLOTS
S20 SEGMENTS GUARANTEED
S21 SEGMENT SURPLUS ADDED TO NUMBER OF CLEAN SEGMENTS
S22 CALCULATION OF NUMBER USED
END

FIG. 8
1 HOST
3 MANAGING TERMINAL
10 DISK ARRAY DEVICE (LOCAL SYSTEM)
210 DATA RECEIVING PART
211 INFLOW AMOUNT CONTROL PART
T4 INFLOW STATE MANAGEMENT INFORMATION
220 CACHE CONTROL PART
230 PHYSICAL DISK CONTROL PART
240 SCHEDULING PART
241 BAND CONTROL PART
T5 MAXIMUM TRANSFER AMOUNT MANAGEMENT INFORMATION

250 TRANSFER PROCESSING PART
251 TRANSFER AMOUNT CALCULATING PART
T6 UNIT TIME TRANSFER AMOUNT MANAGEMENT INFORMATION
5 REMOTE SYSTEM

FIG. 9
T4 INFLOW STATE MANAGEMENT INFORMATION
SLPR NUMBER
INFLOW LIMITATION STATE
INFLOW LIMITED
INFLOW LIMITED
INFLOW DELAY TIME
T5 MAXIMUM TRANSFER AMOUNT MANAGEMENT INFORMATION
SLPR NUMBER
MAXIMUM TRANSFER AMOUNT
T6 UNIT TIME TRANSFER AMOUNT MANAGEMENT INFORMATION
SLPR NUMBER
UNIT TIME TRANSFER AMOUNT

FIG. 10
BAND CONTROL PROCESSING
S31 REQUEST TO CACHE CONTROL PART FOR ACQUISITION OF TRANSFER DATA
S32 TRANSFER DATA PRESENT?
END
S33 SPECIFICATION OF SLPR PERFORMING DATA TRANSFER
S34 UNIT TIME TRANSFER AMOUNT : MAXIMUM TRANSFER AMOUNT
S35 INSTRUCTION TO TRANSFER PROCESSING PART FOR DATA TRANSFER
S36 INSTRUCTION TO INFLOW CONTROL PART FOR INITIATION OF INFLOW LIMITATION

FIG. 11
INFLOW AMOUNT CONTROL PROCESSING
S41 WRITE REQUEST FROM HOST?
S42 RECEIVE DATA WRITTEN INTO CACHE
S43 SPECIFICATION OF SLPR FOR WHICH WRITING IS REQUESTED
S44 INFLOW LIMITATION SET IN SLPR?
S45 STARTING OF COUNT OF RESPONSE DELAY TIME t
S46 RESPONSE DELAY TIME T ELAPSED?
S47 REPORT TO HOST THAT WRITING OF DATA IS COMPLETED

FIG. 12
MAXIMUM TRANSFER AMOUNT SETTING PROCESSING
S51 SLPR SPECIFIED
S52 CONSTRUCTION OF SLPR ACQUIRED
S52 MODE OF REMOTE COPYING ACQUIRED
S53 MODE OF REMOTE COPYING ACQUIRED
S54 USER INSTRUCTIONS RELATING TO INITIAL COPYING AND DIFFERENTIAL COPYING ACQUIRED
S55 MAXIMUM TRANSFER AMOUNT CALCULATED WITH SLPR CONSTRUCTION, MODE OF REMOTE COPYING, USER INSTRUCTIONS AND THE LIKE TAKEN INTO ACCOUNT
S56 CALCULATED MAXIMUM TRANSFER AMOUNT MANUALLY ADJUSTED
S57 MAXIMUM TRANSFER AMOUNT SET
END

What is claimed is:

1. A disk array device comprising:
a channel adapter connected to a host device and an external device via a communications port for controlling the exchange of data with the host device and said external device;
a disk adapter for controlling the exchange of data with a memory device;
a cache memory used by said channel adapter and said disk adapter;
one or more logical system partitions (SLARs) which are constructed by logically dividing resources provided by said channel adapter, said disk adapter, said memory device and said cache memory, each of said logical system partitions including cache logical partitions (CLARs) formed by logically dividing said cache memory;
wherein at least one of said channel adapter and said disk adapter assigns segments to each of said cache logical partitions so that a respective one of said cache logical partitions exclusively utilizes assigned ones of said segments,
wherein said channel adapter assigns said segments, if said segments are guaranteed according to write requests from the host device,
wherein said disk adapter assigns said segments, if said segments are guaranteed according to read requests from the host device,
wherein said at least one of said channel adapter and said disk adapter calculates a number of said segments required for processing a write or read request issued by the host device, and specifies a corresponding said cache logical partition based upon the information for a logical unit for which access was requested by the host device,
wherein said at least one of said channel adapter and said disk adapter compares a number of said segments in use managed by a cache managing table and a cache capacity managed by a CLPR managing table, and
if the number of said segments in use is smaller than the cache capacity of the CLPR, said at least one of said channel adapter and said disk adapter compares the number of said calculated segments required for processing with a number of free segments.

2. The disk array device according to claim 1, wherein if the number of said calculated segments required for processing is equal to or less than the number of free segments, said at least one of said channel adapter and said disk adapter guarantees a number of free segments that is equal to the number of said calculated segments required for processing, and subtracts a number of guaranteed segments from the number of free segments in the cache managing table.

3. The disk array device according to claim 1, wherein if the number of said calculated segments required for processing is more than the number of free segments, said at least one of said channel adapter and said disk adapter guarantees the number of free segments, and adds the number of guaranteed segments to the number of segments in use in the cache managing table.

4. The disk array device according to claim 3, wherein said at least one of said channel adapter and said disk adapter calculates a number of segments that are lacking, and releases segments equal to or greater than the number of segments that are lacking.

5. The disk array device according to claim 4, wherein said at least one of said channel adapter and said disk adapter guarantees the number of segments that are lacking from the released segments, and adds the remaining ones of the released segments as free segments.

6. The disk array device according to claim 1, wherein if the number of said segments in use is equal to or greater than the cache capacity of the CLPR, said at least one of said channel adapter and said disk adapter releases a number of clean slots corresponding to the number of said segments required for processing, and guarantees a number of segments equal to the number of said segments required for processing.

7. A disk array device comprising:
a channel adapter connected to a host device and an external device via a communications port for controlling the exchange of data with the host device and external device;
a disk adapter for controlling the exchange of data with disk drives;
a cache memory used by said channel adapter and disk adapter;
one or more logical system partitions (SPLRs) which are constructed by logically dividing the resources provided by said channel adapter, said disk adapter, a logical unit based on said disk drives and said cache memory,
wherein said channel adapter comprises:
a data receiving part for receiving data from said host device;
a cache control part for storing the received data in a specified region of said cache memory;
a data acquisition part for acquiring data to be transferred from said cache memory to said external device; and
a transfer processing part for transferring the data acquired by said data acquisition part to said external device,
wherein when a write request is generated by the host device, said data receiving part stores the data received from the host device in the cache memory via the cache control part, and specifies one of said logical system partitions corresponding to the write request,
wherein the data receiving part refers to inflow state management information, and judges whether or not inflow limitation is set for said one of said logical system partitions, and
wherein if the inflow limitation is set for said one of said logical system partitions, the data receiving part acquires a response delay time set for said one of said logical system partitions from the inflow state management information, and initiates a measurement of a response delay time.

8. The disk array device according to claim 7, wherein when the response delay time has elapsed, the data receiving part reports the completion of writing to the host device.

9. The disk array device according to claim 7, wherein if the inflow limitation is not set for said one of said logical system partitions, the data receiving part immediately reports the completion of writing to the host device without any deliberately delay of response.

10. A disk array device comprising:
a channel adapter connected to a host device and an external device via a communications port for controlling the exchange of data with the host device and external device, said channel adapter being also connected a managing terminal for managing the disk array device;
a disk adapter for controlling the exchange of data with disk drives;
a cache memory used by said channel adapter and disk adapter;
one or more logical system partitions (SPLRs) which are constructed by logically dividing the resources provided by said channel adapter, said disk adapter, a logical unit based on said disk drives and said cache memory;
wherein said channel adapter comprises:
a data receiving part for receiving data from said host device;
a cache control part for storing the received data in a specified region of said cache memory;
a data acquisition part for acquiring data to be transferred from said cache memory to said external device; and
a transfer processing part for transferring the data acquired by said data acquisition part to said external device,
wherein said managing terminal specifies a maximum transfer amount for at least one of said logical system partitions,
wherein said managing terminal acquires construction information of said at least one of said logical system partitions, a mode of remote copying, and user instructions relating to initial copying and differential copying, and
wherein the mode of remote copying is an asynchronous remote copying mode or a synchronous remote copying mode, and the user instructions relating to initial copying and differential copying include instructions as to whether or not preference is to be given to a quick transition to a recoverable state by ending the initial copying early.

11. The disk array device according to claim 10, wherein said managing terminal calculates the maximum transfer amount by assigning weightings to the construction information of said at least one of said logical system partitions, a mode of remote copying, and user instructions relating to initial copying and differential copying.

12. The disk array device according to claim 10, wherein said managing terminal calculates the maximum transfer amount by considering at least a quantity of logical unit volumes and cache capacity assigned to said at least one of said logical system partitions.

* * * * *